(12) United States Patent
Wang

(10) Patent No.: US 12,284,377 B2
(45) Date of Patent: Apr. 22, 2025

(54) LAYER BASED PARAMETER SET NAL UNIT CONSTRAINTS

(71) Applicant: Huawei Technologies Co., Ltd., Shenzhen (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 17/701,359

(22) Filed: Mar. 22, 2022

(65) Prior Publication Data

US 2022/0217410 A1   Jul. 7, 2022

Related U.S. Application Data

(63) Continuation of application No. PCT/US2020/051311, filed on Sep. 17, 2020.

(Continued)

(51) Int. Cl.
*H04N 19/46* (2014.01)
*H04N 19/102* (2014.01)
(Continued)

(52) U.S. Cl.
CPC ........... *H04N 19/46* (2014.11); *H04N 19/102* (2014.11); *H04N 19/105* (2014.11);
(Continued)

(58) Field of Classification Search
CPC .... H04N 19/46; H04N 19/102; H04N 19/105; H04N 19/132; H04N 19/172;
(Continued)

(56) References Cited

U.S. PATENT DOCUMENTS 7,535,383 B2   5/2009   Segall et al.
8,830,262 B2   9/2014   Haskell et al.
(Continued)

FOREIGN PATENT DOCUMENTS

CN   101317459 A   12/2008
CN   101653002 A   2/2010
(Continued)

OTHER PUBLICATIONS

Guillaume Barroux et al., Proposed specification changes over "High Efficiency Video Coding (HEVC) Screen Content Coding: Draft 4" JCTVC-V0098_r2, Nov. 11, 2015, 35 pages.
(Continued)

*Primary Examiner* — Tung T Vo
(74) *Attorney, Agent, or Firm* — Conley Rose, P.C.

(57) ABSTRACT

A video coding mechanism is disclosed. The mechanism includes receiving a bitstream comprising a picture parameter set (PPS) in a PPS network abstraction layer (NAL) unit and a coded picture comprising a set of video coding layer (VCL) NAL units. A particular VCL NAL unit does not refer to the PPS NAL unit unless a value of a NAL unit header layer identifier (nuh_layer_id) of the PPS NAL unit is less than or equal to a value of a nuh_layer_id of the particular VCL NAL unit. The coded picture is decoded from the set of VCL NAL units based on the PPS in the PPS NAL unit to produce a decoded picture. The decoded picture is forwarded for display as part of a decoded video sequence.

16 Claims, 11 Drawing Sheets

Related U.S. Application Data

(60) Provisional application No. 62/905,236, filed on Sep. 24, 2019.

(51) Int. Cl.
    *H04N 19/105*     (2014.01)
    *H04N 19/132*     (2014.01)
    *H04N 19/169*     (2014.01)
    *H04N 19/172*     (2014.01)
    *H04N 19/174*     (2014.01)
    *H04N 19/30*     (2014.01)
    *H04N 19/70*     (2014.01)

(52) U.S. Cl.
    CPC ......... *H04N 19/132* (2014.11); *H04N 19/172* (2014.11); *H04N 19/174* (2014.11); *H04N 19/188* (2014.11); *H04N 19/30* (2014.11); *H04N 19/70* (2014.11)

(58) Field of Classification Search
    CPC .... H04N 19/174; H04N 19/188; H04N 19/30; H04N 19/70; H04N 21/44004; H04N 19/186; H04N 19/423; H04N 19/184; H04N 19/44
    USPC ..................................................... 375/240.26
    See application file for complete search history.

(56) References Cited

U.S. PATENT DOCUMENTS

| | | |
|---|---|---|
| 9,154,785 B2 | 10/2015 | Wang |
| 9,479,774 B2 | 10/2016 | Wang |
| 9,654,802 B2 | 5/2017 | Wang |
| 2006/0114993 A1 | 6/2006 | Xiong et al. |
| 2007/0086521 A1 | 4/2007 | Wang et al. |
| 2007/0121722 A1 | 5/2007 | Martinian et al. |
| 2008/0007438 A1 | 1/2008 | Segall et al. |
| 2008/0089412 A1 | 4/2008 | Ugur et al. |
| 2010/0098154 A1 | 4/2010 | Lou et al. |
| 2010/0142613 A1 | 6/2010 | Zhu |
| 2011/0064142 A1 | 3/2011 | Haskell et al. |
| 2011/0293091 A1 | 12/2011 | Macchetti |
| 2012/0023249 A1 | 1/2012 | Chen et al. |
| 2013/0077681 A1 | 3/2013 | Chen et al. |
| 2013/0077685 A1 | 3/2013 | Chen et al. |
| 2013/0266075 A1 | 10/2013 | Wang et al. |
| 2013/0272372 A1* | 10/2013 | Hannuksela ........... H04N 19/70 375/240.01 |
| 2013/0279564 A1 | 10/2013 | Wang |
| 2013/0343465 A1* | 12/2013 | Chen ..................... H04N 19/70 375/240.24 |
| 2014/0003487 A1 | 1/2014 | Haque et al. |
| 2014/0003535 A1 | 1/2014 | Haque et al. |
| 2014/0016697 A1 | 1/2014 | Wang |
| 2014/0016707 A1 | 1/2014 | Wang |
| 2014/0022343 A1 | 1/2014 | Chen |
| 2014/0064142 A1 | 3/2014 | Mylarappa et al. |
| 2014/0064384 A1 | 3/2014 | Wang |
| 2014/0086303 A1 | 3/2014 | Wang |
| 2014/0086317 A1 | 3/2014 | Wang |
| 2014/0086331 A1 | 3/2014 | Wang |
| 2014/0086332 A1 | 3/2014 | Wang |
| 2014/0098894 A1 | 4/2014 | Wang |
| 2014/0133547 A1* | 5/2014 | Tanaka ................... H04N 19/46 375/240.26 |
| 2014/0192149 A1 | 7/2014 | Wang et al. |
| 2014/0269896 A1 | 9/2014 | Dao |
| 2014/0355692 A1 | 12/2014 | Ramasubramonian et al. |
| 2015/0016504 A1 | 1/2015 | Auyeung et al. |
| 2015/0016547 A1 | 1/2015 | Tabatabai et al. |
| 2015/0103886 A1* | 4/2015 | He ........................ H04N 19/70 375/240.02 |
| 2015/0103926 A1 | 4/2015 | Hannuksela |
| 2015/0195545 A1 | 7/2015 | Wang et al. |
| 2015/0237372 A1 | 8/2015 | Choi et al. |
| 2015/0264366 A1* | 9/2015 | Hendry ................ H04N 19/597 375/240.04 |
| 2015/0264404 A1 | 9/2015 | Hannuksela |
| 2015/0271498 A1 | 9/2015 | Wang et al. |
| 2015/0271528 A1 | 9/2015 | Wang et al. |
| 2015/0271529 A1 | 9/2015 | Wang et al. |
| 2015/0319462 A1 | 11/2015 | Ramasubramonian et al. |
| 2015/0373343 A1 | 12/2015 | Hendry et al. |
| 2016/0112724 A1 | 4/2016 | Hendry et al. |
| 2016/0165247 A1 | 6/2016 | Deshpande et al. |
| 2016/0191926 A1 | 6/2016 | Deshpande et al. |
| 2016/0255354 A1 | 9/2016 | Yamamoto et al. |
| 2016/0261877 A1 | 9/2016 | Wang |
| 2016/0301957 A1 | 10/2016 | McCarthy et al. |
| 2017/0085878 A1 | 3/2017 | Rojals et al. |
| 2017/0324981 A1 | 11/2017 | Deshpande |
| 2018/0295382 A1 | 10/2018 | Liu et al. |
| 2019/0052910 A1 | 2/2019 | Deshpande |
| 2019/0132612 A1 | 5/2019 | Deshpande |
| 2019/0243881 A1 | 8/2019 | Zia et al. |
| 2020/0389655 A1* | 12/2020 | Seregin ................ H04N 19/174 |
| 2021/0067834 A1 | 3/2021 | Li et al. |
| 2021/0092426 A1* | 3/2021 | Choi ...................... H04N 19/70 |
| 2021/0297705 A1 | 9/2021 | Sjoberg et al. |
| 2021/0392333 A1* | 12/2021 | Paluri .................. H04N 19/188 |
| 2021/0392381 A1* | 12/2021 | Wang .................... H04N 19/82 |
| 2022/0060752 A1 | 2/2022 | Pettersson et al. |
| 2022/0132115 A1* | 4/2022 | Paluri .................. H04N 19/186 |
| 2022/0210478 A1* | 6/2022 | Zhang .................. H04N 19/186 |
| 2022/0217340 A1* | 7/2022 | Zhang .................... H04N 19/82 |
| 2022/0217355 A1* | 7/2022 | Ouedraogo .......... H04N 19/176 |
| 2022/0217375 A1 | 7/2022 | Wang |
| 2022/0217387 A1 | 7/2022 | Wang |
| 2022/0264106 A1* | 8/2022 | Zhang .................... H04N 19/17 |
| 2022/0303582 A1* | 9/2022 | Sánchez De La Fuente ............... H04N 19/44 |

FOREIGN PATENT DOCUMENTS

| | | |
|---|---|---|
| CN | 101658038 A | 2/2010 |
| CN | 104221387 A | 12/2014 |
| CN | 104412600 A | 3/2015 |
| CN | 104471943 A | 3/2015 |
| CN | 104685891 A | 6/2015 |
| CN | 105308971 A | 2/2016 |
| CN | 105706451 A | 6/2016 |
| CN | 105744295 A | 7/2016 |
| CN | 105981387 A | 9/2016 |
| CN | 106134200 A | 11/2016 |
| CN | 106170982 A | 11/2016 |
| CN | 108235006 A | 6/2018 |
| CN | 108650514 A | 10/2018 |
| CN | 109963176 A | 7/2019 |
| JP | 2007166129 A | 6/2007 |
| JP | 2015526970 A | 9/2015 |
| JP | 2015527813 A | 9/2015 |
| JP | 2015529437 A | 10/2015 |
| JP | 2015529438 A | 10/2015 |
| JP | 2015532551 A | 11/2015 |
| JP | 2016506695 A | 3/2016 |
| JP | 2016531451 A | 10/2016 |
| JP | 2017525215 A | 8/2017 |
| JP | 2017535184 A | 11/2017 |
| RU | 2544760 C2 | 3/2015 |
| RU | 2630181 C2 | 9/2017 |
| RU | 2758901 C1 | 11/2021 |
| WO | 2014046813 A2 | 3/2014 |
| WO | 2014047183 A1 | 3/2014 |
| WO | 2014107396 A1 | 7/2014 |
| WO | 2015054634 A2 | 4/2015 |
| WO | 2015056182 A2 | 4/2015 |

OTHER PUBLICATIONS

Miska M. Hannuksela et al., MV-HEVC/SHVC HLS: On TemporalId constraints, JCTVC-Q0109, JCT3V-H0037, Mar. 18, 2014, 7 pages.
"Series H: Audiovisual and Multimedia Systems, Infrastructure of

(56) References Cited

OTHER PUBLICATIONS audiovisual services—Coding of moving video, High efficiency video coding," ITU-T H. 265 Telecommunication Standardization Sector of ITU, Dec. 2016, 26 pages.
Document: JCTVC-Q1008_v5, Chen, J., et al., "High efficiency video coding (HEVC) scalable extension Draft 6," Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, 181 pages.
Document JVET-O2001-vE, Bross, B., et al., "Versatile Video Coding (Draft 6)" Joint Video Experts Team (JVET) of ITU-T SG 16 WP 3 and ISO/IEC JTC 1/SC 29/WG 11, 15th Meeting: Gothenburg, SE, Jul. 3-12, 2019, 25 pages.
Document: JCTVC-V0098_r2, Barroux, G., et al., Proposed specification changes over "High Efficiency Video Coding (HEVC) Screen Content Coding: Draft 4", Joint Collaborative Team on Video Coding (JCT-VC) of ITU-T SG 16 WP 3 and ISO/IEC JTC 1/SC 29/WG 11, 22nd Meeting: Geneva, CH, Oct. 15-21, 2015, 677 pages.
Document: JCTVC-V0098_r2, Barroux, G., et al., Proposed specification changes over "High Efficiency Video Coding (HEVC) Screen Content Coding: Draft 4", Joint Collaborative Team on Video Coding (JCT-VC) of ITU-T SG 16 WP 3 and ISO/IEC JTC 1/SC 29/WG 11, 22nd Meeting: Geneva, CH, Oct. 15-21, 2015, 41 pages.
Chen, Y., et al., "The Emerging MVC Standard for 3D Video Services," Hindawi Publishing Corporation, EURASIP Journal on Advances in Signal Processing, vol. 2009, Article ID 786015, Mar. 25, 2008, 13 pages.
Document JVET-P0203, Drugeon, V., et al., "AHG17: Parsing HRD related SEI messages independently from the SPS," Joint Video Experts Team (JVET) of ITU-T SG 16 WP 3 and ISO/IEC JTC 1/SC 29/WG 11, 16th Meeting: Geneva, CH, Oct. 1-11, 2019, 9 pages.
"Line Transmission of Non-Telephone Signals Video Codec for Audiovisual Services at p×64 kbits," ITU-T Recommendation H.261, Mar. 1993, 29 pages.
"Transmission of Non-Telephone Signals; Information Technology—Generic Coding of Moving Pictures and Associated Audio Information: Video," ITU-T Recommendation H.262, Jul. 1995, 211 pages.
"Series H: Audiovisual and Multimedia Systems; Infrastructure of audiovisual services—Coding of moving video; Video coding for low bit rate communication," ITU-T Recommendation H.263, Jan. 2005, 226 pages.
"Series H: Audiovisual and Multimedia Systems; Infrastructure of audiovisual services—Coding of moving video; Advanced video coding for generic audiovisual services," Recommendation ITU-T H.264, Jun. 2019, 836 pages.
"Series H: Audiovisual and Multimedia Systems; Infrastructure of audiovisual services—Coding of moving video; High efficiency video coding" Recommendation ITU-T H.265, Apr. 2013, 317 pages.
Bross, B., et al., "Versatile Video Coding (Draft 6)," Document: JVET-O2001-vE, Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.
Boyce, J., et al, "Overview of SHVC: Scalable Extensions of the High Efficiency Video Coding Standard," IEEE Transactions on Circuits and Systems for Video Technology, vol. 26, No. 1, Jan. 2016, 16 pages.
Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11, 19th Meeting: by teleconference, Jun. 22-Jul. 1, 2020, 548 pages.
Document: JVET-P0125-v2, Wang, Y.K., "AHG8/AHG17: Miscellaneous HLS topics," Joint Video Experts Team (JVET) of ITU-T SG 16 WP 3 and 1S0/IEC JTC 1/SC 29/WG 11, 16th Meeting: Geneva, CH, Oct. 1-11, 2019, 3 pages, XP030216314.
Document: JVET-R0066-v1, Wang, Y.K., "AHG8/AHG9: On DPB memory allocation and derivation of NoOutputOfPriorPicsFlag," Joint Video Experts Team (JVET) of ITU-T SG 16 WP 3 and ISO/IEC JTC 1/SC 29/WG11, 18th Meeting: by teleconference, Apr. 15-24, 2020, 6 pages, XP030285798.
Document: JVET-P0190-v1, Wang, Y.K., "AHG8/AHG17: Scalable nesting SEI message," Joint Video Experts Team (JVET) of ITU-T SG 16 WP 3 and 1S0/IEC JTC 1/SC 29/WG 11, 16th Meeting: Geneva, CH, Oct. 1-11, 2019, 4 pages, XP030216550.
Document: JVET-P0203, Drugeon, V., "AHG17: Parsing HRD related SEI messages independently from the SPS," Joint Video Experts Team (JVET) of ITU-T SG 16 WP 3 and ISO/IECJTC 1/SC 29/WG 11, 16th Meeting: Geneva, CH, Oct. 1-11, 2019, 6 pages, XP030206129.
Chen, J., et al., "Scalable HEVC (SHVC) Working Draft 2," Video and JCT-VC, ISO/IEC JTC1/SC29/WG11 N13570, Apr. 2013, Incheon, South Korea, 66 pages, XP030020318.
Document: JVET-P2001-v9, Bross, B., et al., "Versatile Video Coding (Draft 7)," Joint Video Experts Team (JVET) of ITU-T SG 16 WP 3 and 1S0/IEC JTC 1/SC 29/WG 11, 16th Meeting: Geneva, CH, Oct. 1-11, 2019, 491 pages, XP030218455.
Document: JVET-S2001-vH, Bross, B., et al., "Versatile Video Coding (Draft 10)," Joint Video Experts Team (JVET) of ITU-T SG 16 WP 3 and ISO/IEC JTC 1/ SC 29/WG11, 19th Meeting: by teleconference, Jun. 22-Jul. 1, 2020, 548 pages, XP030289618.
Document: JCTVC-R1013_v6 , Boyce, J., et al., "Draft high efficiency video coding (HEVC) version 2, combined format range extensions (RExt), scalability (SHVC), and multi-view (MV-HEVC) extensions," Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, 534 pages, XP030240569.
Document: JCTVC-Q1008-v3, Chen, J., et al., "Preliminary version of High efficiency video coding (HEVC) scalable extension Draft 6," Joint Collaborative Team on Video Coding (JCT-VC) of ITU-T SG 16 WP 3 and ISO/IEC JTC 1/SC 29/WG11, 17th Meeting: Valencia, ES, Mar. 27-Apr. 4, 2014, 179 pages, XP030239944.
Document: JVET-O2001-v8, Bross, B., et al., "Versatile Video Coding (Draft 6)," Joint Video Experts Team (JVET) of ITU-T SG 16 WP 3 and ISO/IEC JTC 1/ SC 29/WG11, 15th Meeting: Gothenburg, SE, Jul. 3-12, 2019, 421 pages, XP030293938.
Document: JVET-S0177-v1, Wang, Y.K., et al., "AHG9: On the scalable nesting SEI message," Joint Video Experts Team (JVET) of ITU-T SG 16 WP 3 and ISO/IEC JTC 1/SC 29/WG 11, 19th Meeting: by teleconference, Jun. 22-Jul. 1, 2020, 5 pages, XP030288385.
Document: JVET-O2001-vA, Bross, B., et al., "Versatile Video Coding (Draft 6)," Joint Video Experts Team (JVET) of ITU-T SG 16 WP 3 and ISO/IEC JTC 1/ SC 29/WG11, 15th Meeting: Gothenburg, SE, Jul. 3-12, 2019, 432 pages, XP030293940.
Schwarz et al.: "Overview of the scalable video coding extension of the H. 264/AVC standard", In: IEEE Transactions on circuits and systems for video technology, Sep. 2007, 18 pages.

\* cited by examiner

LAYER BASED PARAMETER SET NAL UNIT CONSTRAINTS

CROSS-REFERENCE TO RELATED APPLICATIONS

This patent application is a continuation of International Application No. PCT/US2020/051311, filed Sep. 17, 2020 by Ye-Kui Wang, and titled "Layer Based Parameter Set NAL Unit Constraints," which claims the benefit of U.S. Provisional Patent Application No. 62/905,236 filed Sep. 24, 2019 by Ye-Kui Wang, and titled "Video Coding Improvements," which are hereby incorporated by reference.

TECHNICAL FIELD

The present disclosure is generally related to video coding, and is specifically related to improvements in signaling parameters to support coding of multi-layer bitstreams.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented by a decoder, the method comprising: receiving, by a receiver of the decoder, a bitstream comprising a picture parameter set (PPS) in a PPS network abstraction layer (NAL) unit and a coded picture comprising a set of video coding layer (VCL) NAL units, wherein a particular VCL NAL unit does not refer to the PPS NAL unit unless a value of a NAL unit header layer identifier (nuh_layer_id) of the PPS NAL unit is less than or equal to a value of a nuh_layer_id of the particular VCL NAL unit; and decoding, by a processor of the decoder, the coded picture from the set of VCL NAL units based on the PPS in the PPS NAL unit to produce a decoded picture.

Some video coding systems code video sequences into layers of pictures. Pictures in different layers have different characteristics. So an encoder can transmit different layers to a decoder depending on decoder side constraints. In order to perform this function, an encoder can encode all of the layers into a single bitstream. Upon request, the encoder can perform a sub-bitstream extraction process to remove extraneous information from the bitstream. The result is an extracted bitstream that contains only the data to decode the requested layer(s). This process can be accomplished by including all data in NAL units. The NAL units each receive a layer identifier (ID) known as a nuh_layer_id. The sub-bitstream extraction process can then remove all NAL units with a nuh_layer_id that is outside a target range. A problem with this approach is that some NAL units relate to many layers. For example, a PPS and an adaptation parameter set (APS) may contain data related to one or many layers. If the nuh_layer_id of the PPS NAL unit or the APS NAL unit is outside the target range, then the PPS and/or APS can be removed by the sub-bitstream extraction process. When this occurs, the decoder does not have sufficient data to decode the extracted bitstream.

The present example constrains the PPS and the APS to ensure that corresponding NAL units are not mistakenly removed from a bitstream during a sub-bitstream extraction process. Specifically, the PPS and APS are referred to by VCL NAL units that contain slices of coded pictures. The PPS NAL unit is constrained to include a nuh_layer_id that is less than or equal to the nuh_layer_id of all VCL NAL units that refer to the PPS in the PPS NAL unit. Likewise, the APS NAL unit is constrained to include a nuh_layer_id that is less than or equal to the nuh_layer_id of all VCL NAL units that refer to the APS in the APS NAL unit. The sub-bitstream extraction process removes NAL units with nuh_layer_ids that are higher than a target nuh_layer_id. By ensuring the PPS NAL unit and the APS NAL unit have a lower nuh_layer_id than all VCL NAL units referring to them, the PPS/APS cannot be removed by a sub-bitstream extraction process that also retains a VCL NAL unit referring to the PPS/APS. Hence, the error is avoided. As a result, the functionality of the encoder and the decoder is improved. Further, coding efficiency is increased by correctly removing unneeded NAL units, which reduces processor, memory, and/or network signaling resource usage at both the encoder and the decoder.

Optionally, in any of the preceding aspects, another implementation of the aspect provides, wherein the bitstream further comprises an APS in an APS NAL unit, and wherein the particular VCL NAL unit does not refer to the APS NAL unit unless a value of a nuh_layer_id of the APS NAL unit is less than or equal to the value of the nuh_layer_id of the particular VCL NAL unit.

Optionally, in any of the preceding aspects, another implementation of the aspect provides, wherein the particular VCL NAL unit comprises a slice of the coded picture and a header containing data elements pertaining to the slice, and wherein the header specifies an APS ID of the APS.

Optionally, in any of the preceding aspects, another implementation of the aspect provides, wherein the particular VCL NAL unit comprises a slice of the coded picture, wherein the slice is associated with a header that contains syntax elements that apply to the slice of the coded picture, and wherein the header specifies a PPS ID of the PPS.

Optionally, in any of the preceding aspects, another implementation of the aspect provides, wherein the bitstream is a result of a sub-bitstream extraction process that removes NAL units from the bitstream based on nuh_layer_id value.

Optionally, in any of the preceding aspects, another implementation of the aspect provides, wherein the set of VCL NAL units are part of a layer when the set of VCL NAL units all have a particular value of nuh_layer_id.

Optionally, in any of the preceding aspects, another implementation of the aspect provides, wherein the layer includes non-VCL NAL units that are associated with the set of VCL NAL units that all have a particular value of nuh_layer_id.

Optionally, in any of the preceding aspects, another implementation of the aspect provides, further comprising: receiving, by the decoder, a second bitstream comprising a second PPS in a second PPS NAL unit and second coded picture comprising a second set of VCL NAL units, wherein a second VCL NAL unit refers to the second PPS NAL unit with a value of a nuh_layer_id of the second PPS NAL unit is not less than or equal to a value of a nuh_layer_id of the second VCL NAL unit; and in response to the receiving, taking some other corrective measures to ensure that a conforming bitstream corresponding to the second bitstream is received prior to decoding the coded picture from the second set of VCL NAL units.

In an embodiment, the disclosure includes a method implemented by an encoder, the method comprising: encoding, by a processor of the encoder, a coded picture comprising a set of VCL NAL units in a bitstream; encoding into the bitstream, by the processor, a PPS in a PPS NAL unit based on a constraint that a particular VCL NAL unit does not refer to the PPS NAL unit unless a value of a nuh_layer_id of the PPS NAL unit is less than or equal to a value of a nuh_layer_id of the particular VCL NAL unit; and storing, by a memory coupled to the processor, the bitstream for communication toward a decoder.

Some video coding systems code video sequences into layers of pictures. Pictures in different layers have different characteristics. So an encoder can transmit different layers to a decoder depending on decoder side constraints. In order to perform this function, an encoder can encode all of the layers into a single bitstream. Upon request, the encoder can perform a sub-bitstream extraction process to remove extraneous information from the bitstream. The result is an extracted bitstream that contains only the data to decode the requested layer(s). This process can be accomplished by including all data in NAL units. The NAL units each receive a layer ID known as a nuh_layer_id. The sub-bitstream extraction process can then remove all NAL units with a nuh_layer_id that is outside a target range. A problem with this approach is that some NAL units relate to many layers. For example, a PPS and an APS may contain data related to one or many layers. If the nuh_layer_id of the PPS NAL unit or the APS NAL unit is outside the target range, then the PPS and/or APS can be removed by the sub-bitstream extraction process. When this occurs, the decoder does not have sufficient data to decode the extracted bitstream.

The present example constrains the PPS and the APS to ensure that corresponding NAL units are not mistakenly removed from a bitstream during a sub-bitstream extraction process. Specifically, the PPS and APS are referred to by VCL NAL units that contain slices of coded pictures. The PPS NAL unit is constrained to include a nuh_layer_id that is less than or equal to the nuh_layer_id of all VCL NAL units that refer to the PPS in the PPS NAL unit. Likewise, the APS NAL unit is constrained to include a nuh_layer_id that is less than or equal to the nuh_layer_id of all VCL NAL units that refer to the APS in the APS NAL unit. The sub-bitstream extraction process removes NAL units with nuh_layer_ids that are higher than a target nuh_layer_id. By ensuring the PPS NAL unit and the APS NAL unit have a lower nuh_layer_id than all VCL NAL units referring to them, the PPS/APS cannot be removed by a sub-bitstream extraction process that also retains a VCL NAL unit referring to the PPS/APS. Hence, the error is avoided. As a result, the functionality of the encoder and the decoder is improved. Further, coding efficiency is increased by correctly removing unneeded NAL units, which reduces processor, memory, and/or network signaling resource usage at both the encoder and the decoder.

Optionally, in any of the preceding aspects, another implementation of the aspect provides, further comprising encoding into the bitstream, by the processor, an adaptation parameter set (APS) in an APS NAL unit based on a constraint that a particular VCL NAL unit does not refer to the APS NAL unit unless a value of a nuh_layer_id of the PPS NAL unit is less than or equal to a value of a nuh_layer_id of the particular VCL NAL unit.

Optionally, in any of the preceding aspects, another implementation of the aspect provides, wherein the particular VCL NAL unit comprises a slice of the coded picture and a header containing data elements pertaining to the slice, and wherein the header specifies an APS ID of the APS.

Optionally, in any of the preceding aspects, another implementation of the aspect provides, wherein the particular VCL NAL unit comprises a slice of the coded picture, wherein the slice is associated with a header that contains syntax elements that apply to the slice of the coded picture, and wherein the header specifies a PPS ID of the PPS.

Optionally, in any of the preceding aspects, another implementation of the aspect provides, further comprising performing, by the processor, a sub-bitstream extraction process to remove NAL units from the bitstream based on nuh_layer_id value.

Optionally, in any of the preceding aspects, another implementation of the aspect provides, wherein the set of VCL NAL units are part of a layer when the set of VCL NAL units all have a particular value of nuh_layer_id.

Optionally, in any of the preceding aspects, another implementation of the aspect provides, wherein the layer includes non-VCL NAL units that are associated with the set of VCL NAL units that all have a particular value of nuh_layer_id.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a PPS in a PPS NAL unit and a coded picture comprising a set of VCL NAL units, wherein a particular VCL NAL unit does not refer to the PPS NAL unit unless a value of a nuh_layer_id of the PPS NAL unit is less than or equal to a value of a nuh_layer_id of the particular VCL NAL unit; a decoding means for decoding the coded picture from the set of VCL NAL units based on the PPS in the PPS NAL unit to produce a decoded picture; and a forwarding means for forwarding the decoded picture for display as part of a decoded video sequence.

Some video coding systems code video sequences into layers of pictures. Pictures in different layers have different characteristics. So an encoder can transmit different layers to a decoder depending on decoder side constraints. In order to perform this function, an encoder can encode all of the layers into a single bitstream. Upon request, the encoder can perform a sub-bitstream extraction process to remove extraneous information from the bitstream. The result is an extracted bitstream that contains only the data to decode the requested layer(s). This process can be accomplished by including all data in NAL units. The NAL units each receive a layer ID known as a nuh_layer_id. The sub-bitstream extraction process can then remove all NAL units with a nuh_layer_id that is outside a target range. A problem with this approach is that some NAL units relate to many layers. For example, a PPS and an APS may contain data related to one or many layers. If the nuh_layer_id of the PPS NAL unit or the APS NAL unit is outside the target range, then the PPS and/or APS can be removed by the sub-bitstream extraction process. When this occurs, the decoder does not have sufficient data to decode the extracted bitstream.

The present example constrains the PPS and the APS to ensure that corresponding NAL units are not mistakenly removed from a bitstream during a sub-bitstream extraction process. Specifically, the PPS and APS are referred to by VCL NAL units that contain slices of coded pictures. The PPS NAL unit is constrained to include a nuh_layer_id that is less than or equal to the nuh_layer_id of all VCL NAL units that refer to the PPS in the PPS NAL unit. Likewise, the APS NAL unit is constrained to include a nuh_layer_id that is less than or equal to the nuh_layer_id of all VCL NAL units that refer to the APS in the APS NAL unit. The sub-bitstream extraction process removes NAL units with nuh_layer_ids that are higher than a target nuh_layer_id. By ensuring the PPS NAL unit and the APS NAL unit have a lower nuh_layer_id than all VCL NAL units referring to them, the PPS/APS cannot be removed by a sub-bitstream extraction process that also retains a VCL NAL unit referring to the PPS/APS. Hence, the error is avoided. As a result, the functionality of the encoder and the decoder is improved. Further, coding efficiency is increased by correctly removing unneeded NAL units, which reduces processor, memory, and/or network signaling resource usage at both the encoder and the decoder.

Optionally, in any of the preceding aspects, another implementation of the aspect provides, wherein the decoder is further configured to perform the method of any of the preceding aspects.

In an embodiment, the disclosure includes an encoder comprising: an encoding means for: encoding a coded picture comprising a set of VCL NAL units in a bitstream; and encoding into the bitstream a PPS in a PPS NAL unit based on a constraint that a particular VCL NAL unit does not refer to the PPS NAL unit unless a value of a nuh_layer_id of the PPS NAL unit is less than or equal to a value of a nuh_layer_id of the particular VCL NAL unit; and a storing means for storing the bitstream for communication toward a decoder.

Some video coding systems code video sequences into layers of pictures. Pictures in different layers have different characteristics. So an encoder can transmit different layers to a decoder depending on decoder side constraints. In order to perform this function, an encoder can encode all of the layers into a single bitstream. Upon request, the encoder can perform a sub-bitstream extraction process to remove extraneous information from the bitstream. The result is an extracted bitstream that contains only the data to decode the requested layer(s). This process can be accomplished by including all data in NAL units. The NAL units each receive a layer ID known as a nuh_layer_id. The sub-bitstream extraction process can then remove all NAL units with a nuh_layer_id that is outside a target range. A problem with this approach is that some NAL units relate to many layers. For example, a PPS and an APS may contain data related to one or many layers. If the nuh_layer_id of the PPS NAL unit or the APS NAL unit is outside the target range, then the PPS and/or APS can be removed by the sub-bitstream extraction process. When this occurs, the decoder does not have sufficient data to decode the extracted bitstream.

The present example constrains the PPS and the APS to ensure that corresponding NAL units are not mistakenly removed from a bitstream during a sub-bitstream extraction process. Specifically, the PPS and APS are referred to by VCL NAL units that contain slices of coded pictures. The PPS NAL unit is constrained to include a nuh_layer_id that is less than or equal to the nuh_layer_id of all VCL NAL units that refer to the PPS in the PPS NAL unit. Likewise, the APS NAL unit is constrained to include a nuh_layer_id that is less than or equal to the nuh_layer_id of all VCL NAL units that refer to the APS in the APS NAL unit. The sub-bitstream extraction process removes NAL units with nuh_layer_ids that are higher than a target nuh_layer_id. By ensuring the PPS NAL unit and the APS NAL unit have a lower nuh_layer_id than all VCL NAL units referring to them, the PPS/APS cannot be removed by a sub-bitstream extraction process that also retains a VCL NAL unit referring to the PPS/APS. Hence, the error is avoided. As a result, the functionality of the encoder and the decoder is improved. Further, coding efficiency is increased by correctly removing unneeded NAL units, which reduces processor, memory, and/or network signaling resource usage at both the encoder and the decoder.

Optionally, in any of the preceding aspects, another implementation of the aspect provides, wherein the encoder is further configured to perform the method of any of the preceding aspects.

In an embodiment, the disclosure includes a method implemented by a decoder, the method comprising: receiving, by a receiver of the decoder, a bitstream comprising a PPS in a PPS NAL unit and a coded picture comprising a set of VCL NAL units, wherein VCL NAL units that refer to the PPS are constrained to include a value of a nuh_layer_id that is less than or equal to a value of a nuh_layer_id of the PPS NAL unit; and decoding, by a processor of the decoder, the coded picture from the set of VCL NAL units based on the PPS in the PPS NAL unit to produce a decoded picture.

Some video coding systems code video sequences into layers of pictures. Pictures in different layers have different characteristics. So an encoder can transmit different layers to a decoder depending on decoder side constraints. In order to perform this function, an encoder can encode all of the layers into a single bitstream. Upon request, the encoder can perform a sub-bitstream extraction process to remove extraneous information from the bitstream. The result is an extracted bitstream that contains only the data to decode the requested layer(s). This process can be accomplished by including all data in NAL units. The NAL units each receive a layer ID known as a nuh_layer_id. The sub-bitstream extraction process can then remove all NAL units with a nuh_layer_id that is outside a target range. A problem with this approach is that some NAL units relate to many layers. For example, a PPS and an APS may contain data related to one or many layers. If the nuh_layer_id of the PPS NAL unit or the APS NAL unit is outside the target range, then the PPS and/or APS can be removed by the sub-bitstream extraction process. When this occurs, the decoder does not have sufficient data to decode the extracted bitstream.

The present example constrains the PPS and the APS to ensure that corresponding NAL units are not mistakenly removed from a bitstream during a sub-bitstream extraction process. Specifically, the PPS and APS are referred to by VCL NAL units that contain slices of coded pictures. The PPS NAL unit is constrained to include a nuh_layer_id that is less than or equal to the nuh_layer_id of all VCL NAL units that refer to the PPS in the PPS NAL unit. Likewise, the APS NAL unit is constrained to include a nuh_layer_id that is less than or equal to the nuh_layer_id of all VCL NAL units that refer to the APS in the APS NAL unit. The sub-bitstream extraction process removes NAL units with nuh_layer_ids that are higher than a target nuh_layer_id. By ensuring the PPS NAL unit and the APS NAL unit have a lower nuh_layer_id than all VCL NAL units referring to them, the PPS/APS cannot be removed by a sub-bitstream extraction process that also retains a VCL NAL unit referring to the PPS/APS. Hence, the error is avoided. As a result, the functionality of the encoder and the decoder is improved. Further, coding efficiency is increased by correctly removing unneeded NAL units, which reduces processor, memory, and/or network signaling resource usage at both the encoder and the decoder.

Optionally, in any of the preceding aspects, another implementation of the aspect provides, wherein the bitstream further comprises an APS in an APS NAL unit, and wherein VCL NAL units that refer to the APS are constrained to include a value of nuh_layer_id that is less than or equal to a value of a nuh_layer_id of the APS NAL unit.

Optionally, in any of the preceding aspects, another implementation of the aspect provides, wherein each VCL NAL unit comprises a slice of the coded picture and a header containing data elements pertaining to the slice, and wherein the header specifies an APS ID of the APS.

Optionally, in any of the preceding aspects, another implementation of the aspect provides, wherein each VCL NAL unit comprises a slice of the coded picture, wherein the slice is associated with a header that contains syntax elements that apply to the slice of the coded picture, and wherein the header specifies a PPS ID of the PPS.

Optionally, in any of the preceding aspects, another implementation of the aspect provides, wherein the bitstream is a result of a sub-bitstream extraction process that removes NAL units from the bitstream based on nuh_layer_id value.

Optionally, in any of the preceding aspects, another implementation of the aspect provides, wherein the set of VCL NAL units are part of a layer when the set of VCL NAL units all have a particular value of nuh_layer_id.

Optionally, in any of the preceding aspects, another implementation of the aspect provides, wherein the layer includes non-VCL NAL units that are associated with the set of VCL NAL units that all have a particular value of nuh_layer_id.

In an embodiment, the disclosure includes a method implemented by an encoder, the method comprising: encoding, by a processor of the encoder, a coded picture comprising a set of VCL NAL units in a bitstream; encoding into the bitstream, by the processor, a PPS in a PPS NAL unit based on a constraint that VCL NAL units that refer to the PPS are constrained to include a value of a nuh_layer_id that is less than or equal to a value of a nuh_layer_id of the PPS NAL unit; and storing, by a memory coupled to the processor, the bitstream for communication toward a decoder.

Some video coding systems code video sequences into layers of pictures. Pictures in different layers have different characteristics. So an encoder can transmit different layers to a decoder depending on decoder side constraints. In order to perform this function, an encoder can encode all of the layers into a single bitstream. Upon request, the encoder can perform a sub-bitstream extraction process to remove extraneous information from the bitstream. The result is an extracted bitstream that contains only the data to decode the requested layer(s). This process can be accomplished by including all data in NAL units. The NAL units each receive a layer ID known as a nuh_layer_id. The sub-bitstream extraction process can then remove all NAL units with a nuh_layer_id that is outside a target range. A problem with this approach is that some NAL units relate to many layers. For example, a PPS and an APS may contain data related to one or many layers. If the nuh_layer_id of the PPS NAL unit or the APS NAL unit is outside the target range, then the PPS and/or APS can be removed by the sub-bitstream extraction process. When this occurs, the decoder does not have sufficient data to decode the extracted bitstream.

The present example constrains the PPS and the APS to ensure that corresponding NAL units are not mistakenly removed from a bitstream during a sub-bitstream extraction process. Specifically, the PPS and APS are referred to by VCL NAL units that contain slices of coded pictures. The PPS NAL unit is constrained to include a nuh_layer_id that is less than or equal to the nuh_layer_id of all VCL NAL units that refer to the PPS in the PPS NAL unit. Likewise, the APS NAL unit is constrained to include a nuh_layer_id that is less than or equal to the nuh_layer_id of all VCL NAL units that refer to the APS in the APS NAL unit. The sub-bitstream extraction process removes NAL units with nuh_layer_ids that are higher than a target nuh_layer_id. By ensuring the PPS NAL unit and the APS NAL unit have a lower nuh_layer_id than all VCL NAL units referring to them, the PPS/APS cannot be removed by a sub-bitstream extraction process that also retains a VCL NAL unit referring to the PPS/APS. Hence, the error is avoided. As a result, the functionality of the encoder and the decoder is improved. Further, coding efficiency is increased by correctly removing unneeded NAL units, which reduces processor, memory, and/or network signaling resource usage at both the encoder and the decoder.

Optionally, in any of the preceding aspects, another implementation of the aspect provides, further comprising encoding into the bitstream, by the processor, an APS in an APS NAL unit based on a constraint that VCL NAL units that refer to the APS are constrained to include a value of nuh_layer_id that is less than or equal to a value of a nuh_layer_id of the APS NAL unit.

Optionally, in any of the preceding aspects, another implementation of the aspect provides, wherein each VCL NAL unit comprises a slice of the coded picture and a header containing data elements pertaining to the slice, and wherein the header specifies an APS ID of the APS.

Optionally, in any of the preceding aspects, another implementation of the aspect provides, wherein each VCL NAL unit comprises a slice of the coded picture, wherein the slice is associated with a header that contains syntax elements that apply to the slice of the coded picture, and wherein the header specifies a PPS ID of the PPS.

Optionally, in any of the preceding aspects, another implementation of the aspect provides, further comprising performing, by the processor, a sub-bitstream extraction process to remove NAL units from the bitstream based on nuh_layer_id value.

Optionally, in any of the preceding aspects, another implementation of the aspect provides, wherein the set of VCL NAL units are part of a layer when the set of VCL NAL units all have a particular value of nuh_layer_id.

Optionally, in any of the preceding aspects, another implementation of the aspect provides, wherein the layer includes non-VCL NAL units that are associated with the set of VCL NAL units that all have a particular value of nuh_layer_id.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
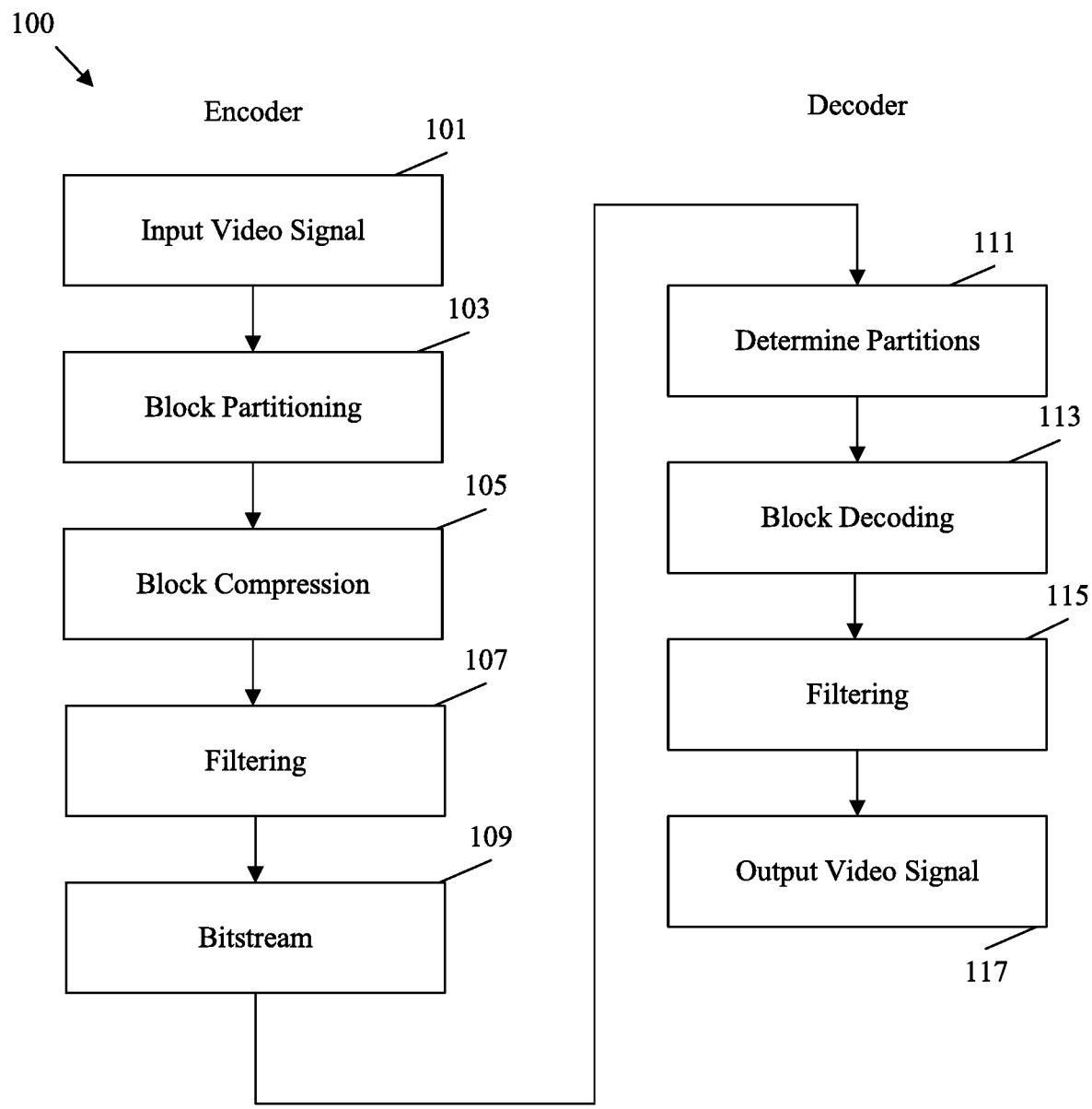
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A slice is an integer number of complete tiles or an integer number of consecutive complete coding tree unit (CTU) rows (e.g., within a tile) of a picture that are exclusively contained in a single network abstraction layer (NAL) unit. A picture that is being encoded or decoded can be referred to as a current picture for clarity of discussion. A coded picture is a coded representation of a picture comprising video coding layer (VCL) NAL units with a particular value of NAL unit header layer identifier (nuh_layer_id) within an access unit (AU) and containing all coding tree units (CTUs) of the picture. A decoded picture is a picture produced by applying a decoding process to a coded picture.

An AU is a set of coded pictures that are included in different layers and are associated with the same time for output from a decoded picture buffer (DPB). A NAL unit is a syntax structure containing data in the form of a Raw Byte Sequence Payload (RBSP), an indication of the type of data, and interspersed as desired with emulation prevention bytes. A VCL NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations. A layer is a set of VCL NAL units that share a specified characteristic (e.g., a common resolution, frame rate, image size, etc.) as indicated by layer ID and associated non-VCL NAL units. A NAL unit header layer identifier (nuh_layer_id) is a syntax element that specifies an identifier of a layer that includes a NAL unit.

A picture parameter set (PPS) is a syntax structure containing syntax elements that apply to entire coded pictures as determined by a syntax element found in each picture header. A PPS NAL is a NAL unit that contains a PPS. A PPS ID, also denoted as pps_pic_parameter_set_id, is an identifier that identifies the PPS for reference by other syntax elements. An adaptation parameter set (APS) is a syntax structure containing syntax elements that apply to slices as determined by syntax elements found in slice headers. An APS NAL is a NAL unit that contains an APS. An APS ID, also denoted as aps_adaptation_parameter_set_id, is an identifier for the APS for reference by other syntax elements. A picture header is a syntax structure containing syntax elements that apply to all slices of a coded picture. A slice header is a part of a coded slice containing data elements pertaining to all tiles or CTU rows within a tile represented in the slice. A coded video sequence is a set of one or more coded pictures. A decoded video sequence is a set of one or more decoded pictures. A sub-bitstream extraction process is a process by which NAL units in a bitstream that are not included in a target set, determined by a target output layer set (OLS) index and a target highest temporal identifier (TemporalId), are removed from the bitstream, with the output sub-bitstream including the NAL units in the bitstream that are included in the target set.

The following acronyms are used herein, Access Unit (AU), Coding Tree Block (CTB), Coding Tree Unit (CTU), Coding Unit (CU), Coded Layer Video Sequence (CLVS), Coded Layer Video Sequence Start (CLVSS), Coded Video Sequence (CVS), Coded Video Sequence Start (CVSS), Joint Video Experts Team (JVET), Hypothetical Reference Decoder HRD, Motion Constrained Tile Set (MCTS), Maximum Transfer Unit (MTU), Network Abstraction Layer (NAL), Output Layer Set (OLS), Picture Order Count (POC), Random Access Point (RAP), Raw Byte Sequence Payload (RBSP), Sequence Parameter Set (SPS), Video Parameter Set (VPS), Versatile Video Coding (VVC).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-O2001-v14.

Some video coding systems code video sequences into layers of pictures. Pictures in different layers have different characteristics. So an encoder can transmit different layers to a decoder depending on decoder side constraints. In order to perform this function, an encoder can encode all of the layers into a single bitstream. Upon request, the encoder can perform a sub-bitstream extraction process to remove extraneous information from the bitstream. The result is an extracted bitstream that contains only the data to decode the requested layer(s). This process can be accomplished by including all data in network abstraction layer (NAL) units. The NAL units each receive a layer identifier (ID) known as a NAL unit header layer identifier (nuh_layer_id). The sub-bitstream extraction process can then remove all NAL units with a nuh_layer_id that is outside a target range. A problem with this approach is that some NAL units relate to many layers. For example, a picture parameter set (PPS) and an adaptation parameter set (APS) may contain data related to one or many layers. If the nuh_layer_id of the PPS NAL unit or the APS NAL unit is outside the target range, then the PPS and/or APS can be removed by the sub-bitstream extraction process. When this occurs, the decoder does not have sufficient data to decode the extracted bitstream.

Disclosed herein is a mechanism to constrain the PPS and the APS to ensure that corresponding NAL units are not mistakenly removed from a bitstream during a sub-bitstream extraction process. Specifically, the PPS and APS are referred to by video coding layer (VCL) NAL units that contain slices of coded pictures. The PPS NAL unit is constrained to include a nuh_layer_id that is less than or equal to the nuh_layer_id of all VCL NAL units that refer to the PPS in the PPS NAL unit. Likewise, the APS NAL unit is constrained to include a nuh_layer_id that is less than or equal to the nuh_layer_id of all VCL NAL units that refer to the APS in the APS NAL unit. The sub-bitstream extraction process removes NAL units with nuh_layer_ids that are higher than a target nuh_layer_id. By ensuring the PPS NAL unit and the APS NAL unit have a lower nuh_layer_id than all VCL NAL units referring to them, the PPS/APS cannot be removed by a sub-bitstream extraction process that also retains a VCL NAL unit referring to the PPS/APS. Hence, the error is avoided. As a result, the functionality of the encoder and the decoder is improved. Further, coding efficiency is increased by correctly removing unneeded NAL units, which reduces processor, memory, and/or network signaling resource usage at both the encoder and the decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
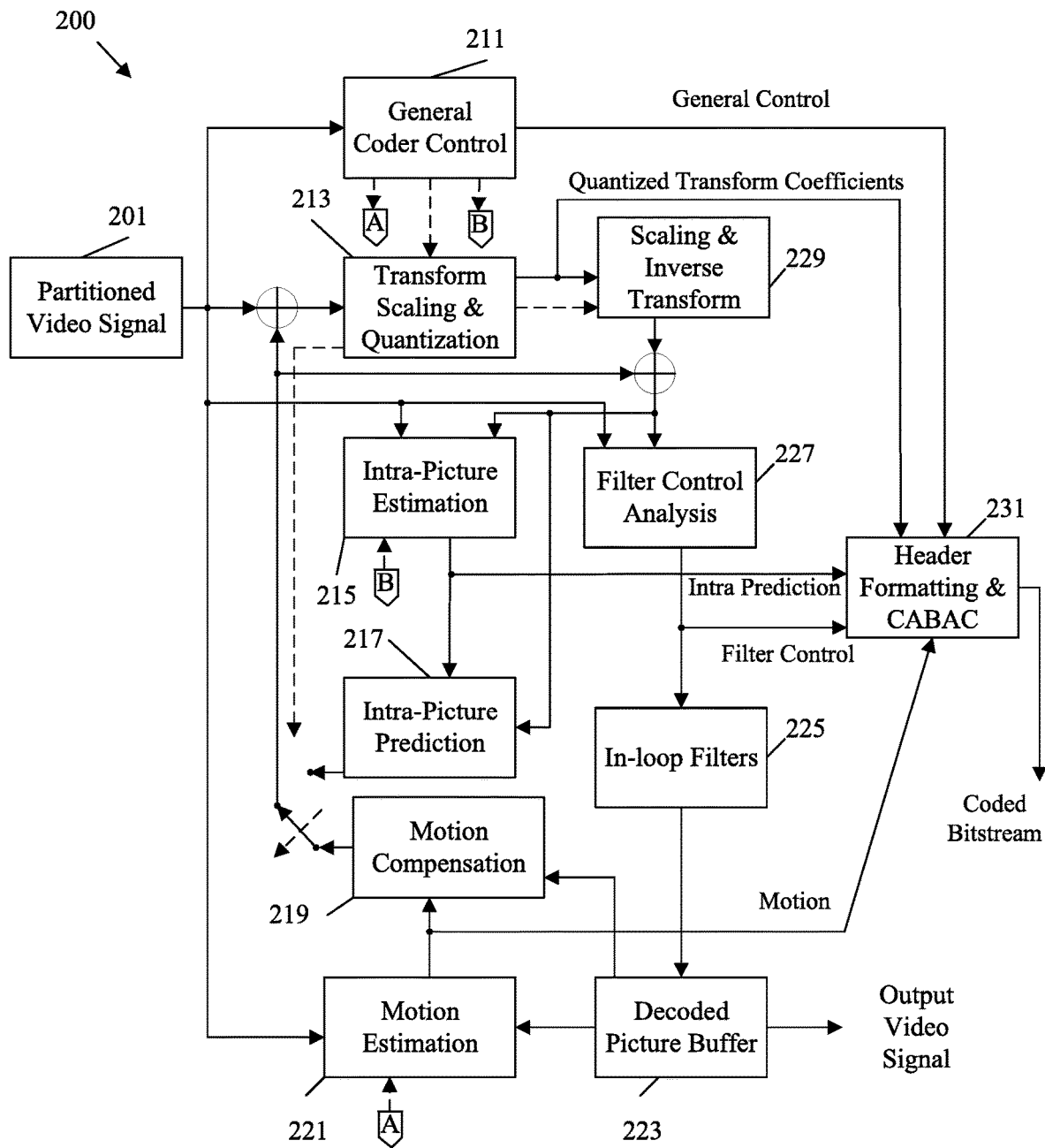
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit containing prediction data and/or a transform unit (TU) containing transformed residual data for the CU. The motion estimation component 221 generates motion vectors, prediction units, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a prediction unit of a video block in an inter-coded slice by comparing the position of the prediction unit to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the prediction unit of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
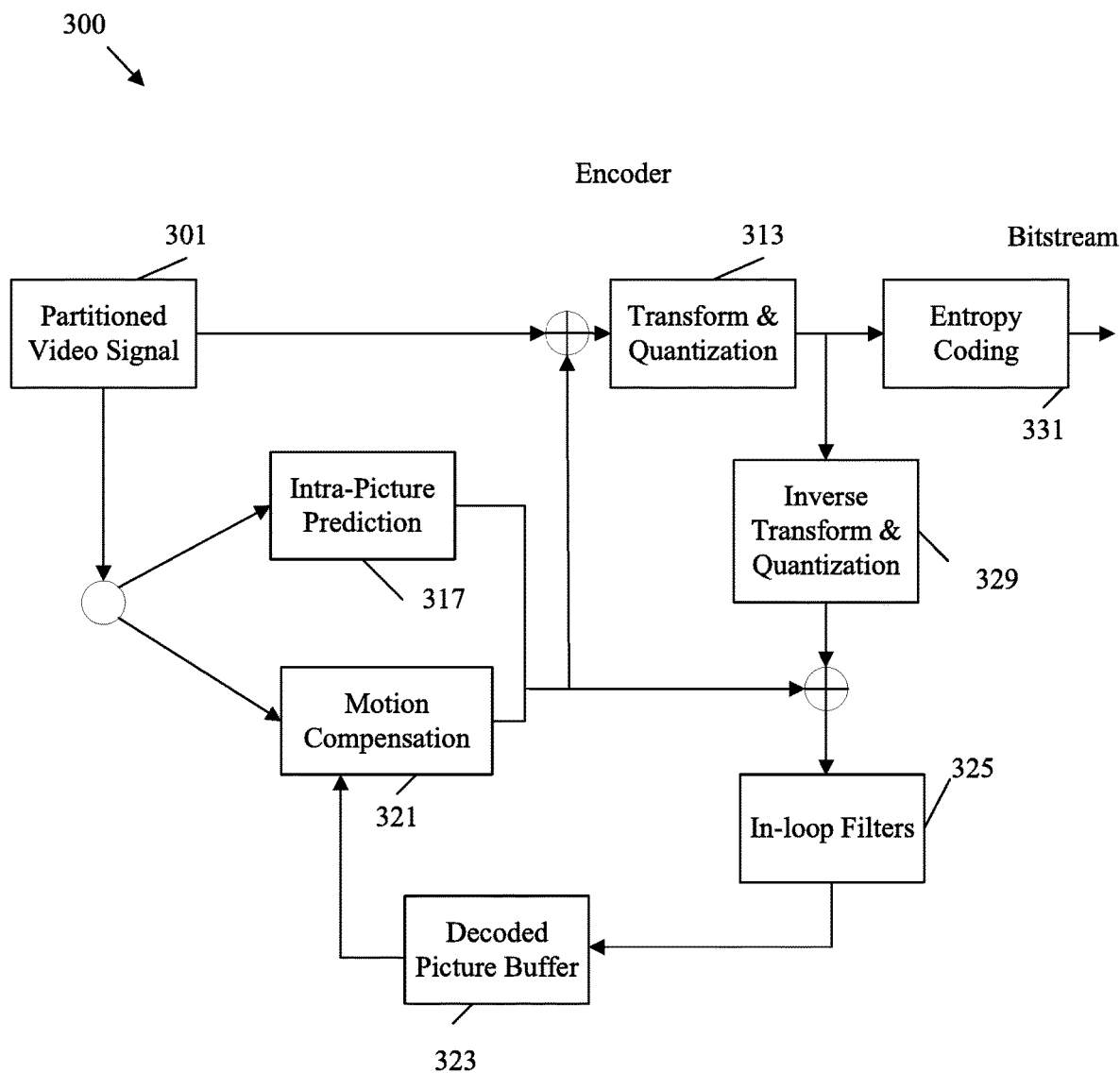
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
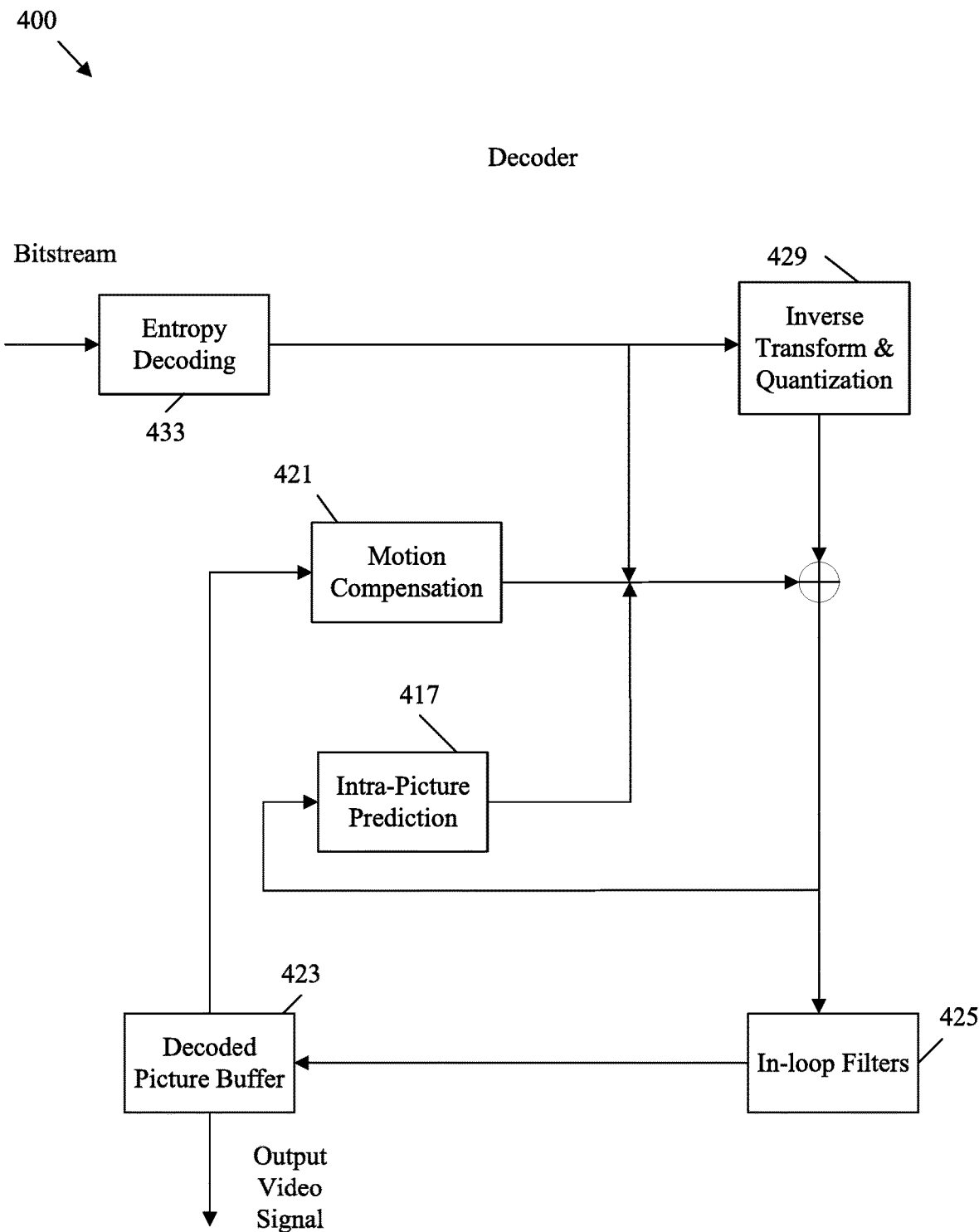
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
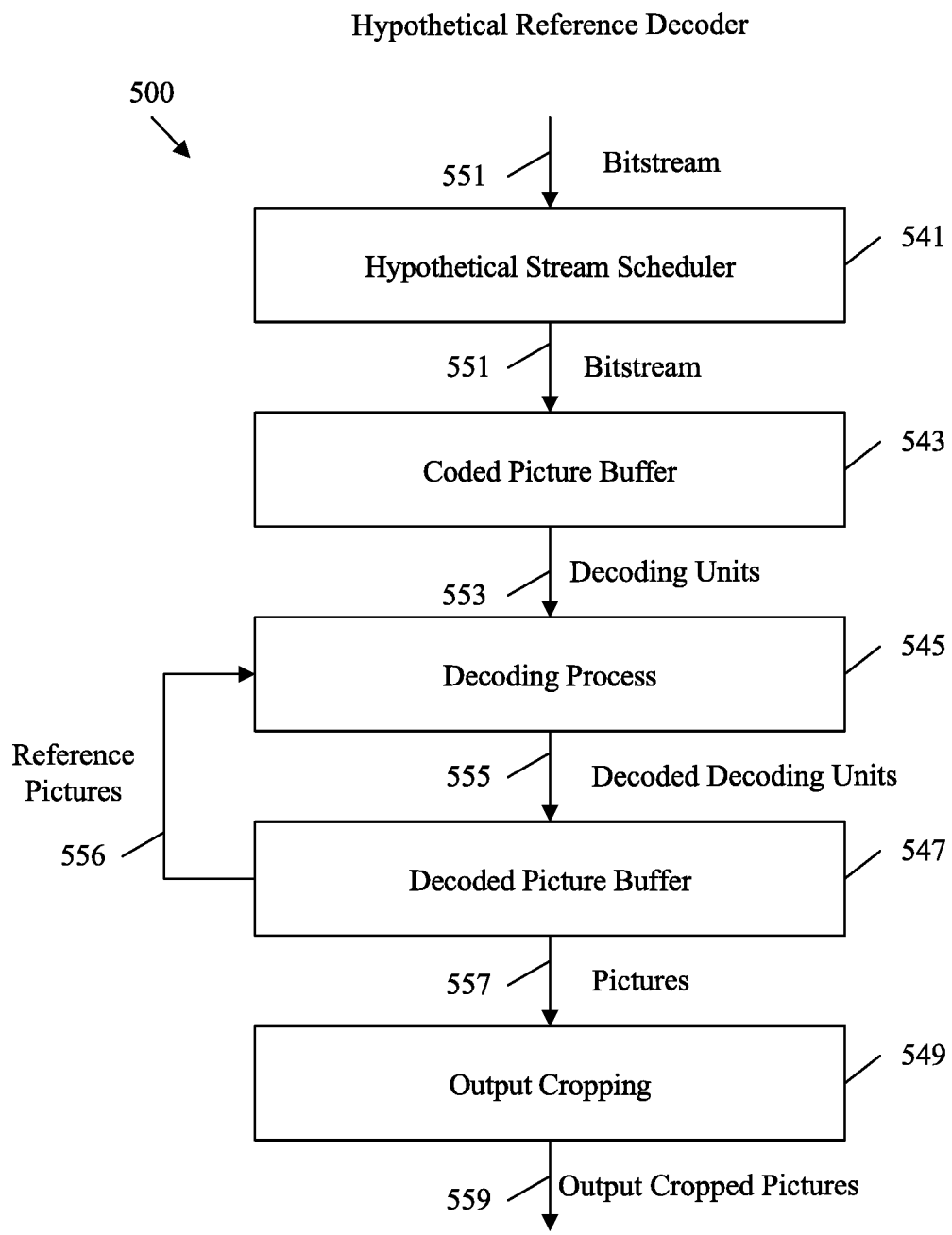
FIG. 5 is a schematic diagram illustrating an example hypothetical reference decoder (HRD).

FIG. 5 is a schematic diagram illustrating an example HRD 500. A HRD 500 may be employed in an encoder, such as codec system 200 and/or encoder 300. The HRD 500 may check the bitstream created at step 109 of method 100 before the bitstream is forwarded to a decoder, such as decoder 400. In some examples, the bitstream may be continuously forwarded through the HRD 500 as the bitstream is encoded. In the event that a portion of the bitstream fails to conform to associated constraints, the HRD 500 can indicate such failure to an encoder to cause the encoder to re-encode the corresponding section of the bitstream with different mechanisms.

The HRD 500 includes a hypothetical stream scheduler (HSS) 541. A HSS 541 is a component configured to perform a hypothetical delivery mechanism. The hypothetical delivery mechanism is used for checking the conformance of a bitstream or a decoder with regards to the timing and data flow of a bitstream 551 input into the HRD 500. For example, the HSS 541 may receive a bitstream 551 output from an encoder and manage the conformance testing process on the bitstream 551. In a particular example, the HSS 541 can control the rate that coded pictures move through the HRD 500 and verify that the bitstream 551 does not contain non-conforming data.

The HSS 541 may forward the bitstream 551 to a CPB 543 at a predefined rate. The HRD 500 may manage data in decoding units (DU) 553. A DU 553 is an Access Unit (AU) or a sub-set of an AU and associated non-video coding layer (VCL) network abstraction layer (NAL) units. Specifically, an AU contains one or more pictures associated with an output time. For example, an AU may contain a single picture in a single layer bitstream, and may contain a picture for each layer in a multi-layer bitstream. Each picture of an AU may be divided into slices that are each included in a corresponding VCL NAL unit. Hence, a DU 553 may contain one or more pictures, one or more slices of a picture, or combinations thereof. Also, parameters used to decode the AU, pictures, and/or slices can be included in non-VCL NAL units. As such, the DU 553 contains non-VCL NAL units that contain data needed to support decoding the VCL NAL units in the DU 553. The CPB 543 is a first-in first-out buffer in the HRD 500. The CPB 543 contains DUs 553 including video data in decoding order. The CPB 543 stores the video data for use during bitstream conformance verification.

The CPB 543 forwards the DUs 553 to a decoding process component 545. The decoding process component 545 is a component that conforms to the VVC standard. For example, the decoding process component 545 may emulate a decoder 400 employed by an end user. The decoding process component 545 decodes the DUs 553 at a rate that can be achieved by an example end user decoder. If the decoding process component 545 cannot decode the DUs 553 fast enough to prevent an overflow of the CPB 543, then the bitstream 551 does not conform to the standard and should be re-encoded.

The decoding process component 545 decodes the DUs 553, which creates decoded DUs 555. A decoded DU 555 contains a decoded picture. The decoded DUs 555 are forwarded to a DPB 547. The DPB 547 may be substantially similar to a decoded picture buffer component 223, 323, and/or 423. To support inter-prediction, pictures that are marked for use as reference pictures 556 that are obtained from the decoded DUs 555 are returned to the decoding process component 545 to support further decoding. The DPB 547 outputs the decoded video sequence as a series of pictures 557. The pictures 557 are reconstructed pictures that generally mirror pictures encoded into the bitstream 551 by the encoder.

The pictures 557 are forwarded to an output cropping component 549. The output cropping component 549 is configured to apply a conformance cropping window to the pictures 557. This results in output cropped pictures 559. An output cropped picture 559 is a completely reconstructed picture. Accordingly, the output cropped picture 559 mimics what an end user would see upon decoding the bitstream 551. As such, the encoder can review the output cropped pictures 559 to ensure the encoding is satisfactory.

The HRD 500 is initialized based on HRD parameters in the bitstream 551. For example, the HRD 500 may read HRD parameters from a VPS, a SPS, and/or SEI messages. The HRD 500 may then perform conformance testing operations on the bitstream 551 based on the information in such HRD parameters. As a specific example, the HRD 500 may determine one or more CPB delivery schedules from the HRD parameters. A delivery schedule specifies timing for delivery of video data to and/or from a memory location, such as a CPB and/or a DPB. Hence, a CPB delivery schedule specifies timing for delivery of AUs, DUs 553, and/or pictures, to/from the CPB 543. It should be noted that the HRD 500 may employ DPB delivery schedules for the DPB 547 that are similar to the CPB delivery schedules.

Video may be coded into different layers and/or OLSs for use by decoders with varying levels of hardware capabilities as well for varying network conditions. The CPB delivery schedules are selected to reflect these issues. Accordingly, higher layer sub-bitstreams are designated for optimal hardware and network conditions and hence higher layers may receive one or more CPB delivery schedules that employ a large amount of memory in the CPB 543 and short delays for transfers of the DUs 553 toward the DPB 547. Likewise, lower layer sub-bitstreams are designated for limited decoder hardware capabilities and/or poor network conditions. Hence, lower layers may receive one or more CPB delivery schedules that employ a small amount of memory in the CPB 543 and longer delays for transfers of the DUs 553 toward the DPB 547. The OLSs, layers, sublayers, or combinations thereof can then be tested according to the corresponding delivery schedule to ensure that the resulting sub-bitstream can be correctly decoded under the conditions that are expected for the sub-bitstream. Accordingly, the HRD parameters in the bitstream 551 can indicate the CPB delivery schedules as well as include sufficient data to allow the HRD 500 to determine the CPB delivery schedules and correlate the CPB delivery schedules to the corresponding OLSs, layers, and/or sublayers.

Figure 6:
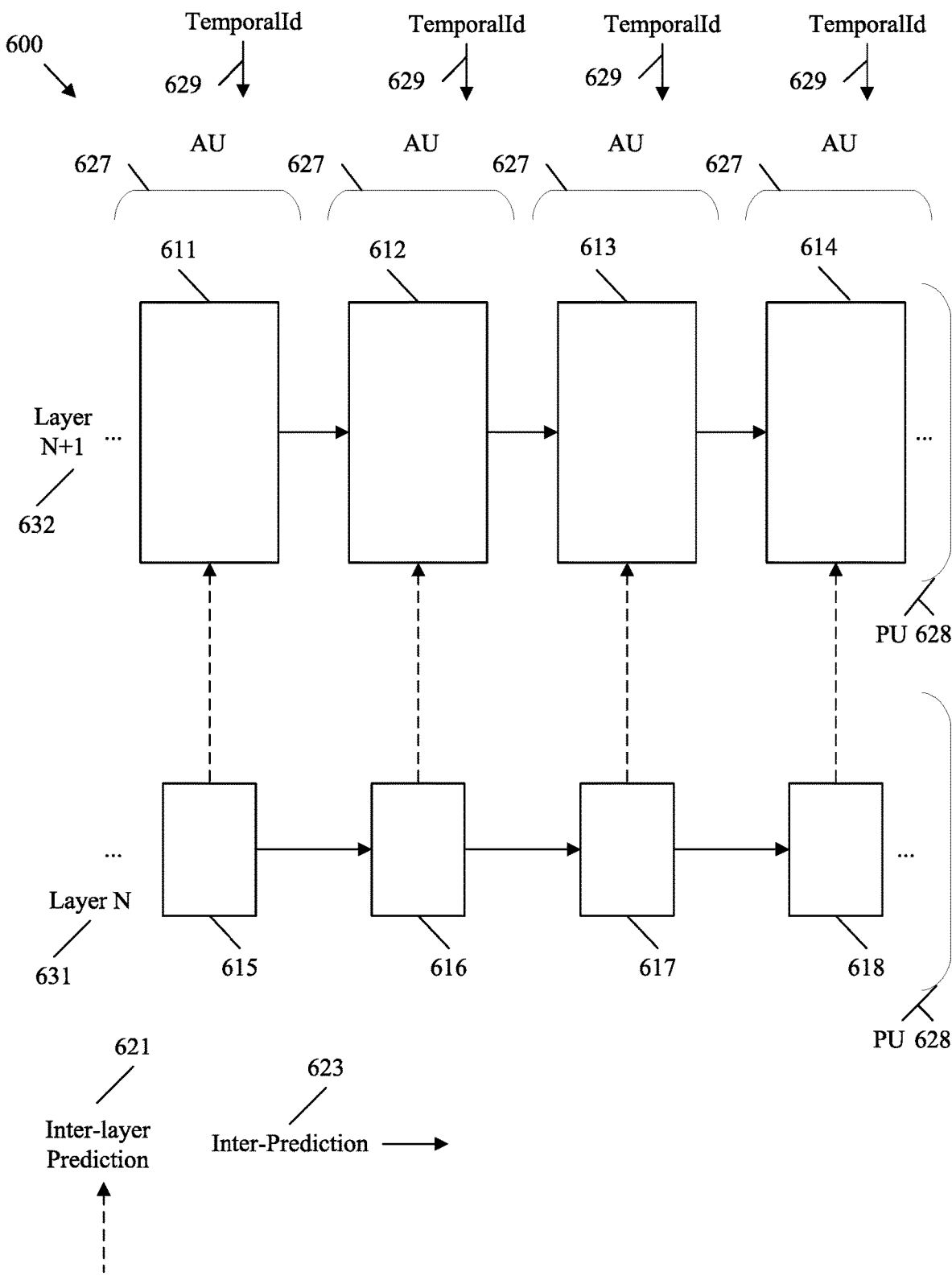
FIG. 6 is a schematic diagram illustrating an example multi-layer video sequence.

FIG. 6 is a schematic diagram illustrating an example multi-layer video sequence 600. The multi-layer video sequence 600 may be encoded by an encoder, such as codec system 200 and/or encoder 300 and decoded by a decoder, such as codec system 200 and/or decoder 400, for example according to method 100. Further, the multi-layer video sequence 600 can be checked for standard conformance by a HRD, such as HRD 500. The multi-layer video sequence 600 is included to depict an example application for layers in a coded video sequence. A multi-layer video sequence 600 is any video sequence that employs a plurality of layers, such as layer N 631 and layer N+1 632.

In an example, the multi-layer video sequence 600 may employ inter-layer prediction 621. Inter-layer prediction 621 is applied between pictures 611, 612, 613, and 614 and pictures 615, 616, 617, and 618 in different layers. In the example shown, pictures 611, 612, 613, and 614 are part of layer N+1 632 and pictures 615, 616, 617, and 618 are part of layer N 631. A layer, such as layer N 631 and/or layer N+1 632, is a group of pictures that are all associated with a similar value of a characteristic, such as a similar size, quality, resolution, signal to noise ratio, capability, etc. A layer may be defined formally as a set of VCL NAL units that share the same layer ID and associated non-VCL NAL units. A VCL NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations.

In the example shown, layer N+1 632 is associated with a larger image size than layer N 631. Accordingly, pictures 611, 612, 613, and 614 in layer N+1 632 have a larger picture size (e.g., larger height and width and hence more samples) than pictures 615, 616, 617, and 618 in layer N 631 in this example. However, such pictures can be separated between layer N+1 632 and layer N 631 by other characteristics. While only two layers, layer N+1 632 and layer N 631, are shown, a set of pictures can be separated into any number of layers based on associated characteristics. Layer N+1 632 and layer N 631 may also be denoted by a layer ID. A layer ID is an item of data that is associated with a picture and denotes the picture is part of an indicated layer. Accordingly, each picture 611-618 may be associated with a corresponding layer ID to indicate which layer N+1 632 or layer N 631 includes the corresponding picture. For example, a layer ID may include a NAL unit header layer identifier (nuh_layer_id), which is a syntax element that specifies an identifier of a layer that includes a NAL unit (e.g., that include slices and/or parameters of the pictures in a layer). A layer associated with a lower quality/smaller image size/smaller bitstream size, such as layer N 631, is generally assigned a lower layer ID and is referred to as a lower layer. Further, a layer associated with a higher quality/larger image size/larger bitstream size, such as layer N+1 632, is generally assigned a higher layer ID and is referred to as a higher layer.

Pictures 611-618 in different layers 631-632 are configured to be displayed in the alternative. As a specific example, a decoder may decode and display picture 615 at a current display time if a smaller picture is desired or the decoder may decode and display picture 611 at the current display time if a larger picture is desired. As such, pictures 611-614 at higher layer N+1 632 contain substantially the same image data as corresponding pictures 615-618 at lower layer N 631 (notwithstanding the difference in picture size). Specifically, picture 611 contains substantially the same image data as picture 615, picture 612 contains substantially the same image data as picture 616, etc.

Pictures 611-618 can be coded by reference to other pictures 611-618 in the same layer N 631 or N+1 632. Coding a picture in reference to another picture in the same layer results in inter-prediction 623. Inter-prediction 623 is depicted by solid line arrows. For example, picture 613 may be coded by employing inter-prediction 623 using one or two of pictures 611, 612, and/or 614 in layer N+1 632 as a reference, where one picture is referenced for unidirectional inter-prediction and/or two pictures are referenced for bidirectional inter-prediction. Further, picture 617 may be coded by employing inter-prediction 623 using one or two of pictures 615, 616, and/or 618 in layer N 631 as a reference, where one picture is referenced for unidirectional inter-prediction and/or two pictures are referenced for bidirectional inter-prediction. When a picture is used as a reference for another picture in the same layer when performing inter-prediction 623, the picture may be referred to as a reference picture. For example, picture 612 may be a reference picture used to code picture 613 according to inter-prediction 623. Inter-prediction 623 can also be referred to as intra-layer prediction in a multi-layer context. As such, inter-prediction 623 is a mechanism of coding samples of a current picture by reference to indicated samples in a reference picture that is different from the current picture where the reference picture and the current picture are in the same layer.

Pictures 611-618 can also be coded by reference to other pictures 611-618 in different layers. This process is known as inter-layer prediction 621, and is depicted by dashed arrows. Inter-layer prediction 621 is a mechanism of coding samples of a current picture by reference to indicated samples in a reference picture where the current picture and the reference picture are in different layers and hence have different layer IDs. For example, a picture in a lower layer N 631 can be used as a reference picture to code a corresponding picture at a higher layer N+1 632. As a specific example, picture 611 can be coded by reference to picture 615 according to inter-layer prediction 621. In such a case, the picture 615 is used as an inter-layer reference picture. An inter-layer reference picture is a reference picture used for inter-layer prediction 621. In most cases, inter-layer prediction 621 is constrained such that a current picture, such as picture 611, can only use inter-layer reference picture(s) that are included in the same AU 627 and that are at a lower layer, such as picture 615. When multiple layers (e.g., more than two) are available, inter-layer prediction 621 can encode/decode a current picture based on multiple inter-layer reference picture(s) at lower levels than the current picture.

A video encoder can employ a multi-layer video sequence 600 to encode pictures 611-618 via many different combinations and/or permutations of inter-prediction 623 and inter-layer prediction 621. For example, picture 615 may be coded according to intra-prediction. Pictures 616-618 can then be coded according to inter-prediction 623 by using picture 615 as a reference picture. Further, picture 611 may be coded according to inter-layer prediction 621 by using picture 615 as an inter-layer reference picture. Pictures 612-614 can then be coded according to inter-prediction 623 by using picture 611 as a reference picture. As such, a reference picture can serve as both a single layer reference picture and an inter-layer reference picture for different coding mechanisms. By coding higher layer N+1 632 pictures based on lower layer N 631 pictures, the higher layer N+1 632 can avoid employing intra-prediction, which has much lower coding efficiency than inter-prediction 623 and inter-layer prediction 621. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

The pictures 611-618 may also be included in access units (AUs) 627. An AU 627 is a set of coded pictures that are included in different layers and are associated with the same output time during decoding. Accordingly, coded pictures in the same AU 627 are scheduled for output from a DPB at a decoder at the same time. For example, pictures 614 and 618 are in the same AU 627. Pictures 613 and 617 are in a different AU 627 from pictures 614 and 618. Pictures 614 and 618 in the same AU 627 may be displayed in the alternative. For example, picture 618 may be displayed when a small picture size is desired and picture 614 may be displayed when a large picture size is desired. When the large picture size is desired, picture 614 is output and picture 618 is used only for interlayer prediction 621. In this case, picture 618 is discarded without being output once interlayer prediction 621 is complete.

An AU 627 can be further divided into one or more picture units (PUs) 628. A PU 628 is a subset of an AU 627 that contains a single coded picture. A PU 628 can be formally defined as a set of NAL units that are associated with each other according to a specified classification rule, are consecutive in decoding order, and contain exactly one coded picture. It should be noted that a PU 628 can be referred to as a decoding unit (DU) when discussed in terms of a HRD and/or associated conformance tests.

It should also be noted that pictures 611-618, and hence AUs 627 and PUs 628, are each associated with a temporal identifier (TemporalId) 629. A TemporalId 629 is an identifier that indicates the relative position of a NAL unit in a video sequence. Pictures and/or PUs 628 in the same AU 627 are associated with the same value of TemporalId 629. For example, a first AU 627 in a sequence may include a TemporalId 629 of zero, with subsequent AUs 627 including consecutively increasing TemporalIds 629. Non-VCL NAL units may also be associated with TemporalIds 629. For example, a parameter set may be included in an AU 627 and may be associated with one or more pictures in the AU 627. In such a case, the TemporalId 629 of the parameter set may be less than or equal to the TemporalId 629 of the AU 627.

Figure 7:
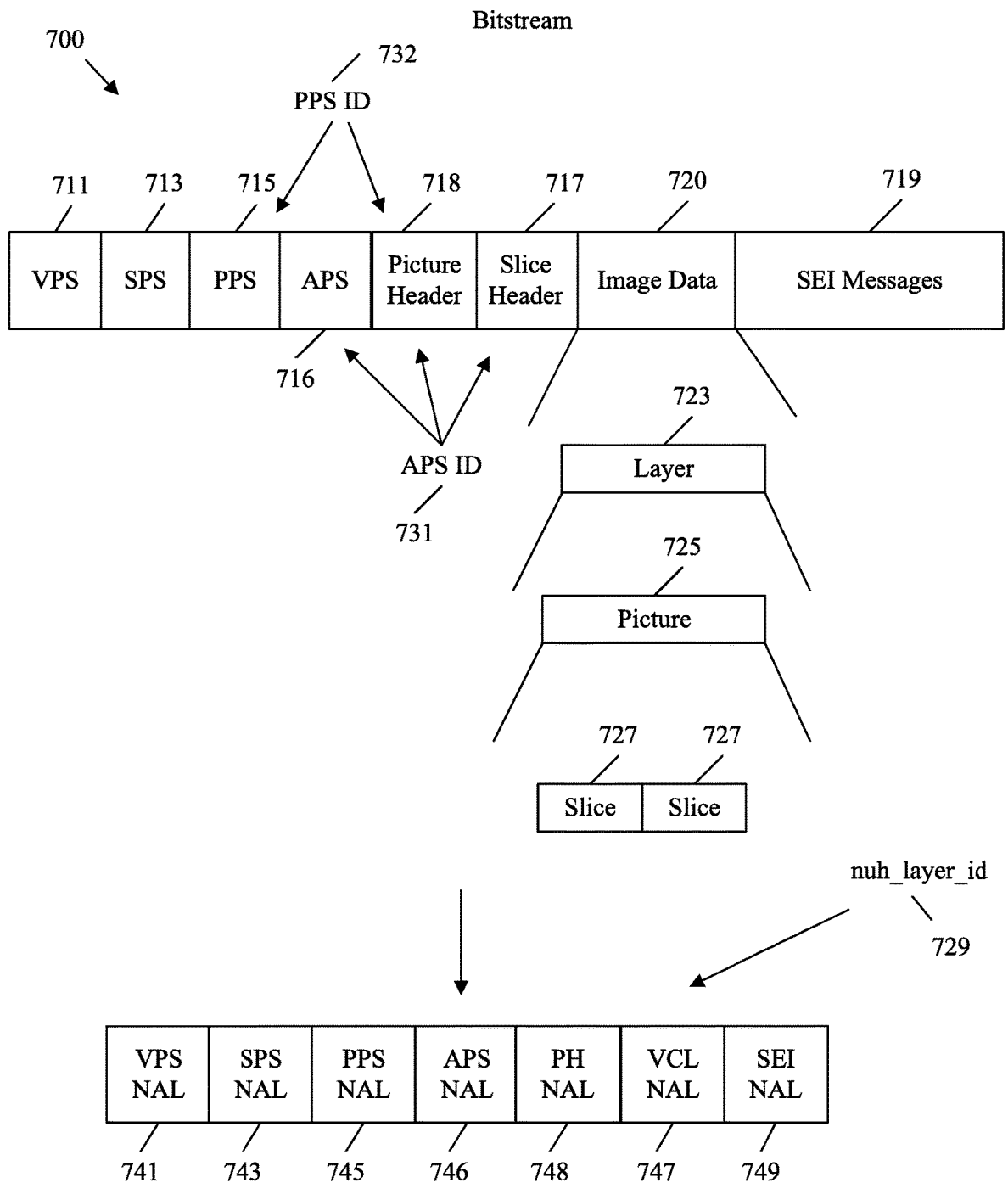
FIG. 7 is a schematic diagram illustrating an example bitstream.

FIG. 7 is a schematic diagram illustrating an example bitstream 700. For example, the bitstream 700 can be generated by a codec system 200 and/or an encoder 300 for decoding by a codec system 200 and/or a decoder 400 according to method 100. Further, the bitstream 700 may include a multi-layer video sequence 600. In addition, the bitstream 700 may include various parameters to control the operation of a HRD, such as HRD 500. Based on such parameters, the HRD can check the bitstream 700 for conformance with standards prior to transmission toward a decoder for decoding.

The bitstream 700 includes a VPS 711, one or more SPSs 713, a plurality of picture parameter sets (PPSs) 715, a plurality of adaptation parameter sets (APSs) 716, a plurality of picture headers 718, a plurality of slice headers 717, image data 720, and SEI messages 719. A VPS 711 contains data related to the entire bitstream 700. For example, the VPS 711 may contain data related OLSs, layers, and/or sublayers used in the bitstream 700. An SPS 713 contains sequence data common to all pictures in a coded video sequence contained in the bitstream 700. For example, each layer may contain one or more coded video sequences, and each coded video sequence may reference a SPS 713 for corresponding parameters. The parameters in a SPS 713 can include picture sizing, bit depth, coding tool parameters, bit rate restrictions, etc. It should be noted that, while each sequence refers to a SPS 713, a single SPS 713 can contain data for multiple sequences in some examples. The PPS 715 contains parameters that apply to an entire picture. Hence, each picture in the video sequence may refer to a PPS 715. It should be noted that, while each picture refers to a PPS 715, a single PPS 715 can contain data for multiple pictures in some examples. For example, multiple similar pictures may be coded according to similar parameters. In such a case, a single PPS 715 may contain data for such similar pictures. The PPS 715 can indicate coding tools available for slices in corresponding pictures, quantization parameters, offsets, etc. PPS 715 may be related to a particular set of pictures 725 and the bitstream 700 may include many PPSs 715. As such, each PPS 715 may include a PPS ID 732 that identifies the PPS 715 for reference by other syntax elements. In some examples, the PPS ID 732 may be stored in a PPS picture parameter set ID (ppspicparameter_set_id) syntax element in the PPS 715.

An APS 716 is syntax structure containing syntax elements/parameters that apply to one or more slices 727 in one or more pictures 725. Such correlations can be determined based on syntax elements found in slice headers 717 associated with the slices 727. For example, an APS 716 may apply to at least one, but less than all, slices 727 in a first picture 721, to at least one, but less than all, slices 727 in a second picture 725, etc. An APS 716 can be seperated into multiple types based on the parameters contained in the APS 716. Such types may include adaptive loop filter (ALF) APS, luma mapping with chroma scaling (LMCS) APS, and scaling list (Scaling) APS. An ALF is an adaptive block based filter that includes a transfer function controlled by varible parameters and employs feedback from a feedback loop to refine the transfer function. Further, the ALF is employed to correct coding artifacts (e.g., errors) that occur as a result of block based coding, such as blurring and ringing artifacts. As such, ALF parameters included in an ALF APS may include parameters selected by the encoder to cause an ALF to remove block based coding artifacts during decoding at the decoder. LMCS is a process that is applied as part of the decoding process that maps luma samples to particular values and in some cases also applies a scaling operation to the values of chroma samples. The LMCS tool may reshapes luma components based on mappings to corresponding chroma components in order to reduce rate distortion. As such, a LMCS APS includes parameters selected by the encoder to cause a LMCS tool to reshape luma components. A scaling list APS contains coding tool parameters associated with quantization matrices used by specified filters. As such, an APS 716 may contain parameters used to apply various filters to coded slices 727 during conformance testing at a HRD and/or upon decoding at a decoder. An APS 716 may be related to a particular set of slices 727 and the bitstream 700 may include many APSs 716. As such, each APS 716 may include an APS ID 731 that identifies the APS 716 for reference by other syntax elements. In some examples, the APS ID 731 may be stored in an APS adaptation parameter set ID (aps_adaptation_parameter_set_id) syntax element in the APS 716.

A picture header 718 is a syntax structure containing syntax elements that apply to all slices 727 of a coded picture 725. For example, a picture header 718 may contain picture order count information, reference picture data, data relating in intra-random access point (IRAP) pictures, data related to filter application for a picture 725, etc. A PU may contain exactly one picture header 718 and exactly one picture 725. As such, the bitstream 700 may include exactly one picture header 718 per picture 725. The picture header 718 may also specify the PPS ID 732 that indicates which PPS 715 contains parameters related to the picture 725 that corresponds to the picture header 718. In a specific example, the PPS ID 732 may be stored in the picture header 718 as a picture header (PH) picture parameter set ID (ph_pic_parameter_set_id). The picture header 718 may also specify the APS ID 731 that indicates which APS 716 contains parameters related to the picture 725 that corresponds to the picture header 718. In a specific example, the APS ID 731 may be stored in the picture header 718 as a PH scaling list APS ID (ph_scaling_list_aps_id) or a PH LMCS APS ID (ph_lmcs_aps_id), depending on the example.

A slice header 717 contains parameters that are specific to each slice 727 in a picture 725. Hence, there may be one slice header 717 per slice 727 in the video sequence. The slice header 717 may contain slice type information, filtering information, prediction weights, tile entry points, deblocking parameters, etc. In some instances, syntax elements may be the same for all slices 727 in a picture 725. In order to reduce redundancy, the picture header 718 and slice header 717 may share certain types of information. For example, certain parameters (e.g., filtering parameters) may be included in the picture header 718 when they apply to an entire picture 725 or included in a slice header 717 when they apply to a group of slices 727 that are a subset of the entire picture 725. The slice header 717 may also specify the APS ID 731 that indicates which APS 716 contains parameters related to the slice 727 that corresponds to the slice header 717. In a specific example, the APS ID 731 may be stored in the slice header 717 as a slice header (SH) ALF APS ID for luma components (sh_alf_aps_id_luma) or a SH ALF APS ID for chroma components (sh_alf_aps_id_chroma), depending on the example.

The image data 720 contains video data encoded according to inter-prediction and/or intra-prediction as well as corresponding transformed and quantized residual data. For example, the image data 720 may include layers 723, pictures 725, and/or slices 727. A layer 723 is a set of VCL NAL units that share a specified characteristic (e.g., a common resolution, frame rate, image size, etc.) as indicated by a layer ID, such as a nuh_layer_id 729, and associated non-VCL NAL units. For example, a layer 723 may include a set of pictures 725 that share the same nuh_layer_id 729. A layer 723 may be substantially similar to layers 631, and/or 632. A nuh_layer_id 729 is a syntax element that specifies an identifier of a layer 723 that includes at least one NAL unit. For example, the lowest quality layer 723, known as a base layer, may include the lowest value of nuh_layer_id 729 with increasing values of nuh_layer_id 729 for layers 723 of higher quality. Hence, a lower layer 723 is a layer 723 with a smaller value of nuh_layer_id 729 and a higher layer is a layer 723 with a larger value of nuh_layer_id 729.

A picture 725 is an array of luma samples and/or an array of chroma samples that create a frame or a field thereof. For example, a picture 725 is a coded image that may be output for display or used to support coding of other picture(s) 725 for output. A picture 725 contains one or more slices 727. A slice 727 may be defined as an integer number of complete tiles or an integer number of consecutive complete coding tree unit (CTU) rows (e.g., within a tile) of a picture 725 that are exclusively contained in a single NAL unit. The slices 727 are further divided into CTUs and/or coding tree blocks (CTBs). A CTU is a group of samples of a predefined size that can be partitioned by a coding tree. A CTB is a subset of a CTU and contains luma components or chroma components of the CTU. The CTUs/CTBs are further divided into coding blocks based on coding trees. The coding blocks can then be encoded/decoded according to prediction mechanisms.

A SEI message 719 is a syntax structure with specified semantics that conveys information that is not needed by the decoding process in order to determine the values of the samples in decoded pictures. For example, the SEI messages 719 may contain data to support HRD processes or other supporting data that is not directly relevant to decoding the bitstream 700 at a decoder.

A bitstream 700 can be coded as a sequence of NAL units. A NAL unit is a container for video data and/or supporting syntax. A NAL unit can be a VCL NAL unit 747 or a non-VCL NAL unit. A VCL NAL unit 747 is a NAL unit coded to contain video data. Specifically, a VCL NAL unit 747 contains a slice 727 and an associated slice header 717. A non-VCL NAL unit is a NAL unit that contains non-video data such as syntax and/or parameters that support decoding the video data, performance of conformance checking, or other operations. Non-VCL NAL units may include VPS NAL unit 741, SPS NAL unit 743, PPS NAL unit 745, APS NAL unit 746, PH NAL unit 748, and SEI NAL unit 749, which contain a VPS 711, a SPS 713, a PPS 715, a APS 716, a picture header 718, and a SEI message 719, respectively. It should be noted that the preceding list of NAL units is exemplary and not exhaustive.

As noted above, pictures 725 in different layers 723 have different characteristics. For example, pictures 725 in different layers 723 can be encoded at different sizes, resolution, frame rates, etc. This allows an encoder to transmit different layers 723 to a decoder depending on decoder side constraints. In order to perform this function, an encoder can encode all of the layers 723 into a single bitstream 700. Upon request, the encoder (or a slicer at a content hosting server) can perform a sub-bitstream extraction process to remove extraneous information from the bitstream 700 prior to transmission. The result is an extracted bitstream 700 that contains only the data to decode the requested layer(s) 723. This process can be accomplished by employing the NAL units. Specifically, a nuh_layer_id 729 is included in each of the NAL units. Hence, a nuh_layer_id 729 is included in the VPS NAL unit 741, SPS NAL unit 743, PPS NAL unit 745, APS NAL unit 746, PH NAL unit 748, VCL NAL unit 747, and SEI NAL unit 749. The sub-bitstream extraction process receives a target range that describes the IDs of the requested layers 723. The sub-bitstream extraction process can remove all NAL units with a nuh_layer_id 729 that is outside a target range. This leaves only NAL units with a nuh_layer_id 729 within the target range remaining in the extracted bitstream 700 for transmission to the decoder. A problem with this approach is that some NAL units relate to many layers 723. For example, a PPS NAL unit 745 containing a PPS 715 and an APS NAL unit 746 containing an APS 716 may contain data related to one or many layers 723. If the nuh_layer_id 729 of the PPS NAL unit 745 or the APS NAL unit 746 is outside the target range, then the PPS 715 and/or the APS 716 can be removed by the sub-bitstream extraction process. When this occurs, the PPS 715 and/or the APS 716 are not transmitted to the decoder. In this case, the decoder does not have sufficient data to decode the extracted bitstream 700.

Accordingly, bitstream 700 employs a constraint on the PPS 715 and the APS 716 to ensure that the PPS NAL unit 745 and the APS NAL unit 746 are not mistakenly removed from the bitstream 700 during the sub-bitstream extraction process. Specifically, the PPS 715 and the APS 716 are referred to by the picture header 718 and/or the slice header 717 by employing the PPS ID 732 and the APS ID 731, respectively. The PPS 715 and/or the PPS NAL unit 745 are constrained to include a value of the nuh_layer_id 729 that is less than or equal to the value of the nuh_layer_id 729 of all VCL NAL units 747 that refer to the PPS 715 in the PPS NAL unit 745. The sub-bitstream extraction process may operate on a group of layers based on a request for a value of nuh_layer_id 729 or less. Hence, the constraint ensures that the PPS NAL unit 745 includes a value of nuh_layer_id 729 that is contained within the requested range when the PPS 715 is associated with a VCL NAL unit 747 with a value of nuh_layer_id 729 in the requested range. Accordingly, a particular VCL NAL unit 747 does not refer to the PPS NAL unit 745 unless a value of a nuh_layer_id 729 of the PPS NAL unit 745 is less than or equal to a value of a nuh_layer_id 729 of the particular VCL NAL unit 747. In a particular implementation a nuh_layer_id 729 of the PPS 715 is constrained to be less than or equal to a nuh_layer_id 729 in VCL NAL units 747 associated with a picture 725 when a ph_pic_parameter_set_id in the picture header 718 is set equal to a pps_pic_parameter_set_id in the PPS 715.

Likewise, the APS 716 and/or the APS NAL unit 746 are constrained to include a value of the nuh_layer_id 729 that is less than or equal to the value of the nuh_layer_id 729 of all VCL NAL units 747 that refer to the APS 716 in the APS NAL unit 746. The sub-bitstream extraction process may operate on a group of layers based on a request for a value of nuh_layer_id 729 or less. Hence, the constraint ensures that the APS NAL unit 746 includes a value of nuh_layer_id 729 that is contained within the requested range when the APS 716 is associated with a VCL NAL unit 747 with a value of nuh_layer_id 729 in the requested range. Accordingly, a particular VCL NAL unit 747 does not refer to the APS NAL unit 746 unless a value of a nuh_layer_id 729 of the APS NAL unit 746 is less than or equal to a value of a nuh_layer_id 729 of the particular VCL NAL unit 747. In a particular implementation a nuh_layer_id 729 of the APS 716 is constrained to be less than or equal to a nuh_layer_id 729 in a VCL NAL unit 747 associated with a slice 727 when a ph_scaling_list_aps_id, a ph_lmcs_aps_id, a sh_alf_aps_id_luma, and/or a sh_alf_aps_id_chroma in the picture header 718 and/or slice header 717 is set equal to a aps_adaptation_parameter_set_id in the APS 716.

By ensuring the PPS NAL unit 745 and the APS NAL unit 746 have a lower nuh_layer_id 729 than all VCL NAL units 747 referring to them, the PPS 715 and the APS 716 cannot be removed by a sub-bitstream extraction process that also retains a VCL NAL unit 747 referring to the PPS/APS. Hence, sub-bitstream extraction related errors are avoided. As a result, the functionality of the encoder and the decoder is improved. Further, coding efficiency is increased by correctly removing unneeded NAL units, which reduces processor, memory, and/or network signaling resource usage at both the encoder and the decoder.

The preceding information is now described in more detail herein below. Layered video coding is also referred to as scalable video coding or video coding with scalability. Scalability in video coding may be supported by using multi-layer coding techniques. A multi-layer bitstream comprises a base layer (BL) and one or more enhancement layers (ELs). Example of scalabilities includes spatial scalability, quality/signal to noise ratio (SNR) scalability, multi-view scalability, frame rate scalability, etc. When a multi-layer coding technique is used, a picture or a part thereof may be coded without using a reference picture (intra-prediction), may be coded by referencing reference pictures that are in the same layer (inter-prediction), and/or may be coded by referencing reference pictures that are in other layer(s) (inter-layer prediction). A reference picture used for inter-layer prediction of the current picture is referred to as an inter-layer reference picture (ILRP). FIG. 6 illustrates an example of multi-layer coding for spatial scalability in which pictures in different layers have different resolutions.

Some video coding families provide support for scalability in separated profile(s) from the profile(s) for single-layer coding. Scalable video coding (SVC) is a scalable extension of the advanced video coding (AVC) that provides support for spatial, temporal, and quality scalabilities. For SVC, a flag is signaled in each macroblock (MB) in EL pictures to indicate whether the EL MB is predicted using the collocated block from a lower layer. The prediction from the collocated block may include texture, motion vectors, and/or coding modes. Implementations of SVC may not directly reuse unmodified AVC implementations in their design. The SVC EL macroblock syntax and decoding process differs from the AVC syntax and decoding process.

Scalable HEVC (SHVC) is an extension of HEVC that provides support for spatial and quality scalabilities. Multiview HEVC (MV-HEVC) is an extension of HEVC that provides support for multi-view scalability. 3D HEVC (3D-HEVC) is an extension of HEVC that provides support for 3D video coding that is more advanced and more efficient than MV-HEVC. Temporal scalability may be included as an integral part of a single-layer HEVC codec. In the multi-layer extension of HEVC, decoded pictures used for inter-layer prediction come only from the same AU and are treated as long-term reference pictures (LTRPs). Such pictures are assigned reference indices in the reference picture list(s) along with other temporal reference pictures in the current layer. Inter-layer prediction (ILP) is achieved at the prediction unit level by setting the value of the reference index to refer to the inter-layer reference picture(s) in the reference picture list(s). Spatial scalability resamples a reference picture or part thereof when an ILRP has a different spatial resolution than the current picture being encoded or decoded. Reference picture resampling can be realized at either picture level or coding block level.

VVC may also support layered video coding. A VVC bitstream can include multiple layers. The layers can be all independent from each other. For example, each layer can be coded without using inter-layer prediction. In this case, the layers are also referred to as simulcast layers. In some cases, some of the layers are coded using ILP. A flag in the VPS can indicate whether the layers are simulcast layers or whether some layers use ILP. When some layers use ILP, the layer dependency relationship among layers is also signaled in the VPS. Unlike SHVC and MV-HEVC, VVC may not specify OLSs. An OLS includes a specified set of layers, where one or more layers in the set of layers are specified to be output layers. An output layer is a layer of an OLS that is output. In some implementations of VVC, only one layer may be selected for decoding and output when the layers are simulcast layers. In some implementations of VVC, the entire bitstream including all layers is specified to be decoded when any layer uses ILP. Further, certain layers among the layers are specified to be output layers. The output layers may be indicated to be only the highest layer, all the layers, or the highest layer plus a set of indicated lower layers.

The preceding aspects contain certain problems. For example, the nuh_layer_id values for SPS, PPS, and APS NAL units may not be properly constrained. Further, the TemporalId value for SEI NAL units may not be properly constrained. In addition, setting of NoOutputOfPriorPicsFlag may not be properly specified when reference picture resampling is enabled and pictures within a CLVS have different spatial resolutions. Also, in some video coding systems suffix SEI messages cannot be contained in a scalable nesting SEI message. As another example, buffering period, picture timing, and decoding unit information SEI messages may include parsing dependencies on VPS and/or SPS.

In general, this disclosure describes video coding improvement approaches. The descriptions of the techniques are based on VVC. However, the techniques also apply to layered video coding based on other video codec specifications.

One or more of the abovementioned problems may be solved as follows. The nuh_layer_id values for SPS, PPS, and APS NAL units are properly constrained herein. The TemporalId value for SEI NAL units is properly constrained herein. Setting of the NoOutputOfPriorPicsFlag is properly specified when reference picture resampling is enabled and pictures within a CLVS have different spatial resolutions. Suffix SEI messages are allowed to be contained in a scalable nesting SEI message. Parsing dependencies of BP, PT, and DUI SEI messages on VPS or SPS may be removed by repeating the syntax element decoding_unit_hrd_params_present_flag in the BP SEI message syntax, the syntax elements decoding_unit_hrd_params_present_flag and decoding_unit_cpb_params_in_pic_timing_sei_flag in the PT SEI message syntax, and the syntax element decoding_unit_cpb_params_in_pic_timing_sei_flag in the DUI SEI message.

An example implementation of the preceding mechanisms is as follows. An example general NAL unit semantics is as follows.

A nuh_temporal_id_plus1 minus 1 specifies a temporal identifier for the NAL unit. The value of nuh_temporal_id_plus1 should not be equal to zero. The variable TemporalId may be derived as follows:

$$TemporalId = \text{nuh\_temporal\_id\_plus1} - 1$$

When nal_unit_type is in the range of IDR_W_RADL to RSV_IRAP_13, inclusive, TemporalId should be equal to zero. When nal_unit_type is equal to STSA_NUT, TemporalId should not be equal to zero.

The value of TemporalId should be the same for all VCL NAL units of an access unit. The value of TemporalId of a coded picture, a layer access unit, or an access unit may be the value of the TemporalId of the VCL NAL units of the coded picture, the layer access unit, or the access unit. The value of TemporalId of a sub-layer representation may be the greatest value of TemporalId of all VCL NAL units in the sub-layer representation.

The value of TemporalId for non-VCL NAL units is constrained as follows. If nal_unit_type is equal to DPS_NUT, VPS_NUT, or SPS_NUT, TemporalId is equal to zero and the TemporalId of the access unit containing the NAL unit should be equal to zero. Otherwise if nal_unit_type is equal to EOS_NUT or EOB_NUT, TemporalId should be equal to zero. Otherwise, if nal_unit_type is equal to AUD_NUT, FD_NUT, PREFIX_SEI_NUT, or SUFFIX_SEI_NUT, TemporalId should be equal to the TemporalId of the access unit containing the NAL unit. Otherwise, when nal_unit_type is equal to PPS_NUT or APS_NUT, TemporalId should be greater than or equal to the TemporalId of the access unit containing the NAL unit. When the NAL unit is a non-VCL NAL unit, the value of TemporalId should be equal to the minimum value of the TemporalId values of all access units to which the non-VCL NAL unit applies. When nal_unit_type is equal to PPS_NUT or APS_NUT, TemporalId may be greater than or equal to the TemporalId of the containing access unit. This is because all PPSs and APSs may be included in the beginning of a bitstream. Further, the first coded picture has TemporalId equal to zero.

An example sequence parameter set RBSP semantics is as follows. An SPS RBSP should be available to the decoding process prior to being referenced. The SPS may be included in at least one access unit with TemporalId equal to zero or provided through external mechanism. The SPS NAL unit containing the SPS may be constrained to have a nuh_layer_id equal to the lowest nuh_layer_id value of PPS NAL units that refer to the SPS.

An example picture parameter set RBSP semantics is as follows. A PPS RBSP should be available to the decoding process prior to being referenced. The PPS should be included in at least one access unit with TemporalId less than or equal to the TemporalId of the PPS NAL unit or provided through external mechanism. The PPS NAL unit containing the PPS RBSP should have a nuh_layer_id equal to the lowest nuh_layer_id value of the coded slice NAL units that refer to the PPS.

An example adaptation parameter set semantics is as follows. Each APS RBSP should be available to the decoding process prior to being referenced. The APS should also be included in at least one access unit with TemporalId less than or equal to the TemporalId of the coded slice NAL unit that refers the APS or provided through an external mechanism. An APS NAL unit is allowed to be shared by pictures/slices of multiple layers. The nuh_layer_id of an APS NAL unit should be equal to the lowest nuh_layer_id value of the coded slice NAL units that refer to the APS NAL unit. Alternatively, an APS NAL unit may not be shared by pictures/slices of multiple layers. The nuh_layer_id of an APS NAL unit should be equal to the nuh_layer_id of slices referring to the APS.

In an example, removal of pictures from the DPB before decoding of the current picture is discussed as follows. The removal of pictures from the DPB before decoding of the current picture (but after parsing the slice header of the first slice of the current picture) may occur at the CPB removal time of the first decoding unit of access unit n (containing the current picture). This proceeds as follows. The decoding process for reference picture list construction is invoked and the decoding process for reference picture marking is invoked.

When the current picture is a coded layer video sequence start (CLVSS) picture that is not picture zero, the following ordered steps are applied. The variable NoOutputOfPriorPicsFlag is derived for the decoder under test as follows. If the value of pic_width_max_in_luma_samples, pic_height_max_in_luma_samples, chroma_format_idc, separate_colour_plane_flag, bit_depth_luma_minus8, bit_depth_chroma_minus8 or sps_max_dec_pic_buffering_minus1[Htid] derived from the SPS is different from the value of pic_width_in_luma_samples, pic_height_in_luma_samples, chroma_format_idc, separate_colour_plane_flag, bit_depth_luma_minus8, bit_depth_chroma_minus8 or sps_max_dec_pic_buffering_minus1[Htid], respectively, derived from the SPS referred to by the preceding picture, NoOutputOfPriorPicsFlag may be set to one by the decoder under test, regardless of the value of no_output_of_prior_pics_flag. It should be noted that, although setting NoOutputOfPriorPicsFlag equal to no_output_of_prior_pics_flag may be preferred under these conditions, the decoder under test is allowed to set NoOutputOfPriorPicsFlag to one in this case. Otherwise, NoOutputOfPriorPicsFlag may be set equal to no_output_of_prior_pics_flag.

The value of NoOutputOfPriorPicsFlag derived for the decoder under test is applied for the HRD, such that when the value of NoOutputOfPriorPicsFlag is equal to 1, all picture storage buffers in the DPB are emptied without output of the pictures they contain, and the DPB fullness is set equal to zero. When both of the following conditions are true for any pictures k in the DPB, all such pictures k in the DPB are removed from the DPB. Picture k is marked as unused for reference, and picture k has PictureOutputFlag equal to zero or a corresponding DPB output time is less than or equal to the CPB removal time of the first decoding unit (denoted as decoding unit m) of the current picture n. This may occur when DpbOutputTime[k] is less than or equal to DuCpbRemovalTime[m]. For each picture that is removed from the DPB, the DPB fullness is decremented by one.

In an example, output and removal of pictures from the DPB is discussed as follows. The output and removal of pictures from the DPB before the decoding of the current picture (but after parsing the slice header of the first slice of the current picture) may occur when the first decoding unit of the access unit containing the current picture is removed from the CPB and proceeds as follows. The decoding process for reference picture list construction and decoding process for reference picture marking are invoked.

If the current picture is a CLVSS picture that is not picture zero, the following ordered steps are applied. The variable NoOutputOfPriorPicsFlag can be derived for the decoder under test as follows. If the value of pic_width_max_in_luma_samples, pic_height_max_in_luma_samples, chroma_format_idc, separate_colour_plane_flag, bit_depth_luma_minus8, bit_depth_chroma_minus8 or sps_max_dec_pic_buffering_minus1[Htid] derived from the SPS is different from the value of pic_width_in_luma_samples, pic_height_in_luma_samples, chroma_format_idc, separate_colour_plane_flag, bit_depth_luma_minus8, bit_depth_chroma_minus8 or sps_max_dec_pic_buffering_minus1[Htid], respectively, derived from the SPS referred to by the preceding picture, NoOutputOfPriorPicsFlag may be set to one by the decoder under test, regardless of the value of no_output_of_prior_pics_flag. It should be noted that although setting NoOutputOfPriorPicsFlag equal to no_output_of_prior_pics_flag is preferred under these conditions, the decoder under test can set NoOutputOfPriorPicsFlag to one in this case. Otherwise, NoOutputOfPriorPicsFlag can be set equal to no_output_of_prior_pics_flag.

The value of NoOutputOfPriorPicsFlag derived for the decoder under test can be applied for the HRD as follows. If NoOutputOfPriorPicsFlag is equal to one, all picture storage buffers in the DPB are emptied without output of the pictures they contain and the DPB fullness is set equal to zero. Otherwise (NoOutputOfPriorPicsFlag is equal to zero), all picture storage buffers containing a picture that is marked as not needed for output and unused for reference are emptied (without output) and all non-empty picture storage buffers in the DPB are emptied by repeatedly invoking a bumping process and the DPB fullness is set equal to zero.

Otherwise (the current picture is not a CLVSS picture), all picture storage buffers containing a picture which are marked as not needed for output and unused for reference are emptied (without output). For each picture storage buffer that is emptied, the DPB fullness is decremented by one. When one or more of the following conditions are true, the bumping process is invoked repeatedly while further decrementing the DPB fullness by one for each additional picture storage buffer that is emptied until none of the following conditions are true. A condition is that the number of pictures in the DPB that are marked as needed for output is greater than sps_max_num_reorder_pics[Htid]. Another condition is that a sps_max_latency_increase_plus1[Htid] is not equal to zero and there is at least one picture in the DPB that is marked as needed for output for which the associated variable PicLatencyCount is greater than or equal to SpsMaxLatencyPictures[Htid]. Another condition is that the number of pictures in the DPB is greater than or equal to SubDpbSize[Htid].

An example general SEI message syntax is as follows.

| | Descriptor |
|---|---|

```
sei_payload( payloadType, payloadSize ) {
  if( nal_unit_type = = PREFIX_SEI_NUT )
    if( payloadType = = 0 )
      buffering_period( payloadSize )
    else if( payloadType = = 1 )
      pic_timing( payloadSize )
    else if( payloadType = = 3 )
      filler_payload( payloadSize )
    else if( payloadType = = 130 )
      decoding_unit_info( payloadSize )
    else if( payloadType = = 133 )
```

-continued

| | Descriptor |
|---|---|
| scalable_nesting( payloadSize ) | |
|   else if( payloadType = = 145 ) | |
|     dependent_rap_indication( payloadSize ) | |
|       // Specified in ITU-T H.SEI | ISO/IEC 23002-7. | |
|   else if( payloadType = = 168 ) | |
|     frame_field_info( payloadSize ) | |
|   else | |
|     reserved_sei_message( payloadSize ) | |
| else /* nal_unit_type = = SUFFIX_SEI_NUT */ | |
|   if( payloadType = = 3 ) | |
|     filler_payload( payloadSize ) | |
|   if( payloadType = = 132 ) | |
|     decoded_picture_hash( payloadSize ) | |
|       // Specified in ITU-T H.SEI | ISO/IEC 23002-7. | |
|   else if( payloadType = = 133 ) | |
|     scalable_nesting( payloadSize ) | |
|   else | |
|     reserved_sei_message( payloadSize ) | |
| if( more_data_in_payload( ) ) { | |
|   if( payload_extension_present( ) ) | |
|     reserved_payload_extension_data | u(v) |
|   payload_bit_equal_to_one /* equal to 1 */ | f(1) |
|   while( !byte_aligned( ) ) | |
|     payload_bit_equal_to_zero /* equal to 0 */ | f(1) |
|   } | |
| } | |

An example scalable nesting SEI message syntax is as follows.

| | Descriptor |
|---|---|
| scalable_nesting( payloadSize ) { | |
|   nesting_ols_flag | u(1) |
|   if( nesting_ols_flag ) { | |
|     nesting_num_olss_minus1 | ue(v) |
|     for( i = 0; i <= nesting_num_olss_minus1; i++ ) { | |
|       nesting_ols_idx_delta_minus1[ i ] | ue(v) |
|       if( NumLayersInOls[ NestingOlsIdx[ i ] ] > 1 ) { | |
|         nesting_num_ols_layers_minus1[ i ] | ue(v) |
|         for( j = 0; j <= nesting_num_ols_layers_minus1[ i ]; j++ ) | |
|           nesting_ols_layer_idx_delta_minus1[ i ][ j ] | ue(v) |
|       } | |
|     } | |
|   } else { | |
|     nesting_all_layers_flag | u(1) |
|     if( !nesting_all_layers_flag ) { | |
|       nesting_num_layers_minus1 | ue(v) |
|       for( i = 1; i <= nesting_num_layers_minus1; i++ ) | |
|         nesting_layer_id[ i ] | u(6) |
|     } | |
|   } | |
|   nesting_num_seis_minus1 | ue(v) |
|   while( !byte_aligned( ) ) | |
|     nesting_zero_bit /* equal to 0 */ | u(1) |
|   for( i = 0; i <= nesting_num_seis_minus1; i++ ) | |
|     sei_message( ) | |
| } | |

An example scalable nesting SEI message semantics is as follows. A scalable nesting SEI message provides a mechanism to associate SEI messages with specific layers in the context of specific OLSs or with specific layers not in the context of an OLS. A scalable nesting SEI message contains one or more SEI messages. The SEI messages contained in the scalable nesting SEI message are also referred to as the scalable-nested SEI messages. Bitstream conformance may require that the following restrictions apply when SEI messages are contained in a scalable nesting SEI message.

An SEI message that has payloadType equal to one hundred thirty two (decoded picture hash) or one hundred thirty three (scalable nesting) should not be contained in a scalable nesting SEI message. When a scalable nesting SEI message contains a buffering period, picture timing, or decoding unit information SEI message, the scalable nesting SEI message should not contain any other SEI message with payloadType not equal to zero (buffering period), one (picture timing), or one hundred thirty (decoding unit information).

Bitstream conformance may also require that the following restrictions apply on the value of the nal_unit_type of the SEI NAL unit containing a scalable nesting SEI message. When a scalable nesting SEI message contains an SEI message that has payloadType equal to zero (buffering period), one (picture timing), one hundred thirty (decoding unit information), one hundred forty five (dependent RAP indication), or one hundred sixty eight (frame-field information), the SEI NAL unit containing the scalable nesting SEI message should have a nal_unit_type set equal to PREFIX_SEI_NUT. When a scalable nesting SEI message contains an SEI message that has payloadType equal to one hundred thirty two (decoded picture hash), the SEI NAL unit containing the scalable nesting SEI message should have a nal_unit_type set equal to SUFFIX_SEI_NUT.

A nesting_ols_flag may be set equal to one to specify that the scalable-nested SEI messages apply to specific layers in the context of specific OLSs. The nesting_ols_flag may be set equal to zero to specify that that the scalable-nested SEI messages generally apply (e.g., not in the context of an OLS) to specific layers.

Bitstream conformance may require that the following restrictions are applied to the value of nesting_ols_flag. When the scalable nesting SEI message contains an SEI message that has payloadType equal to zero (buffering period), one (picture timing), or one hundred thirty (decoding unit information), the value of nesting_ols_flag should be equal to one. When the scalable nesting SEI message contains an SEI message that has payloadType equal to a value in VclAssociatedSeiList, the value of nesting_ols_flag should be equal to zero.

A nesting_num_olss_minus1 plus one specifies the number of OLSs to which the scalable-nested SEI messages apply. The value of nesting_num_olss_minus1 should be in the range of zero to TotalNumOlss−1, inclusive. The nesting_ols_idx_delta_minus1[i] is used to derive the variable NestingOlsIdx[i] that specifies the OLS index of the i-th OLS to which the scalable-nested SEI messages apply when nesting_ols_flag is equal to one. The value of nesting_ols_idx_delta_minus1[i] should be in the range of zero to TotalNumOlss−2, inclusive. The variable NestingOlsIdx[i] may be derived as follows:

```
if( i = = 0 )
   NestingOlsIdx[ i ] = nesting_ols_idx_delta_minus1[ i ]
else
   NestingOlsIdx[ i ] = NestingOlsIdx[ i − 1 ] +
      nesting_ols_idx_delta_minus1[ i ] + 1
```

The nesting_num_ols_layers_minus1[i] plus one specifies the number of layers to which the scalable-nested SEI messages apply in the context of the NestingOlsIdx[i]-th OLS. The value of nesting_num_ols_layers_minus1[i] should be in the range of zero to NumLayersInOls[NestingOlsIdx[i]]−1, inclusive.

The nesting_ols_layer_idx_delta_minus1[i][j] is used to derive the variable NestingOlsLayerIdx[i][j] that specifies the OLS layer index of the j-th layer to which the scalable-nested SEI messages apply in the context of the NestingOlsIdx[i]-th OLS when nesting_ols_flag is equal to one. The value of nesting_ols_layer_idx_delta_minus1[i] should be in the range of zero to NumLayersInOls[nestingOlsIdx[i]]−two, inclusive.

The variable NestingOlsLayerIdx[i][j] may be derived as follows:

```
if( j = = 0 )
    NestingOlsLayerIdx[ i ][ j ] = nesting_ols_layer_idx_delta_minus1[
        i ][ j ]
else
    NestingOlsLayerIdx[ i ][ j ] = NestingOlsLayerIdx[ i ][ j − 1 ] +
        nesting_ols_layer_idx_delta_minus1[ i ][ j ] + 1
```

The lowest value among all values of LayerIdInOls[NestingOlsIdx[i]][NestingOlsLayerIdx[i][0]] for i in the range of zero to nesting_num_olss_minus1, inclusive, should be equal to nuh_layer_id of the current SEI NAL unit (e.g., the SEI NAL unit containing the scalable nesting SEI message). The nesting_all_layers_flag may be set equal to one to specify that the scalable-nested SEI messages generally apply to all layers that have nuh_layer_id greater than or equal to the nuh_layer_id of the current SEI NAL unit. The nesting_all_layers_flag may be set equal to zero to specify that the scalable-nested SEI messages may or may not generally apply to all layers that have nuh_layer_id greater than or equal to the nuh_layer_id of the current SEI NAL unit.

The nesting_num_layers_minus1 plus one specifies the number of layers to which the scalable-nested SEI messages generally apply. The value of nesting_num_layers_minus1 should be in the range of zero to vps_max_layers_minus1−GeneralLayerIdx[nuh_layer_id], inclusive, where nuh_layer_id is the nuh_layer_id of the current SEI NAL unit. The nesting_layer_id[i] specifies the nuh_layer_id value of the i-th layer to which the scalable-nested SEI messages generally apply when nesting_all_layers_flag is equal to zero. The value of nesting_layer_id[i] should be greater than nuh_layer_id, where nuh_layer_id is the nuh_layer_id of the current SEI NAL unit.

When the nesting_ols_flag is equal to one, the variable NestingNumLayers, specifying the number of layer to which the scalable-nested SEI messages generally apply, and the list NestingLayerId[i] for i in the range of zero to NestingNumLayers−1, inclusive, specifying the list of nuh_layer_id value of the layers to which the scalable-nested SEI messages generally apply, are derived as follows, where nuh_layer_id is the nuh_layer_id of the current SEI NAL unit:

```
if( nesting_all_layers_flag ) {
    NestingNumLayers =
vps_max_layers_minus1 + 1 − GeneralLayerIdx[ nuh_layer_id ]
    for( i = 0; i < NestingNumLayers; i ++)
        NestingLayerId[ i ] = vps_layer_id[ GeneralLayerIdx[ nuh_layer_id ] + i ]   (D-2)
} else {
    NestingNumLayers = nesting_num_layers_minus1 + 1
    for( i = 0; i < NestingNumLayers; i ++)
        NestingLayerId[ i ] = ( i = = 0 ) ? nuh_layer_id : nesting_layer_id[ i ]
}
```

The nesting_num_seis_minus1 plus one specifies the number of scalable-nested SEI messages. The value of nesting_num_seis_minus1 should be in the range of zero to sixty three, inclusive. The nesting_zero_bit should be set equal to zero.

Figure 8:
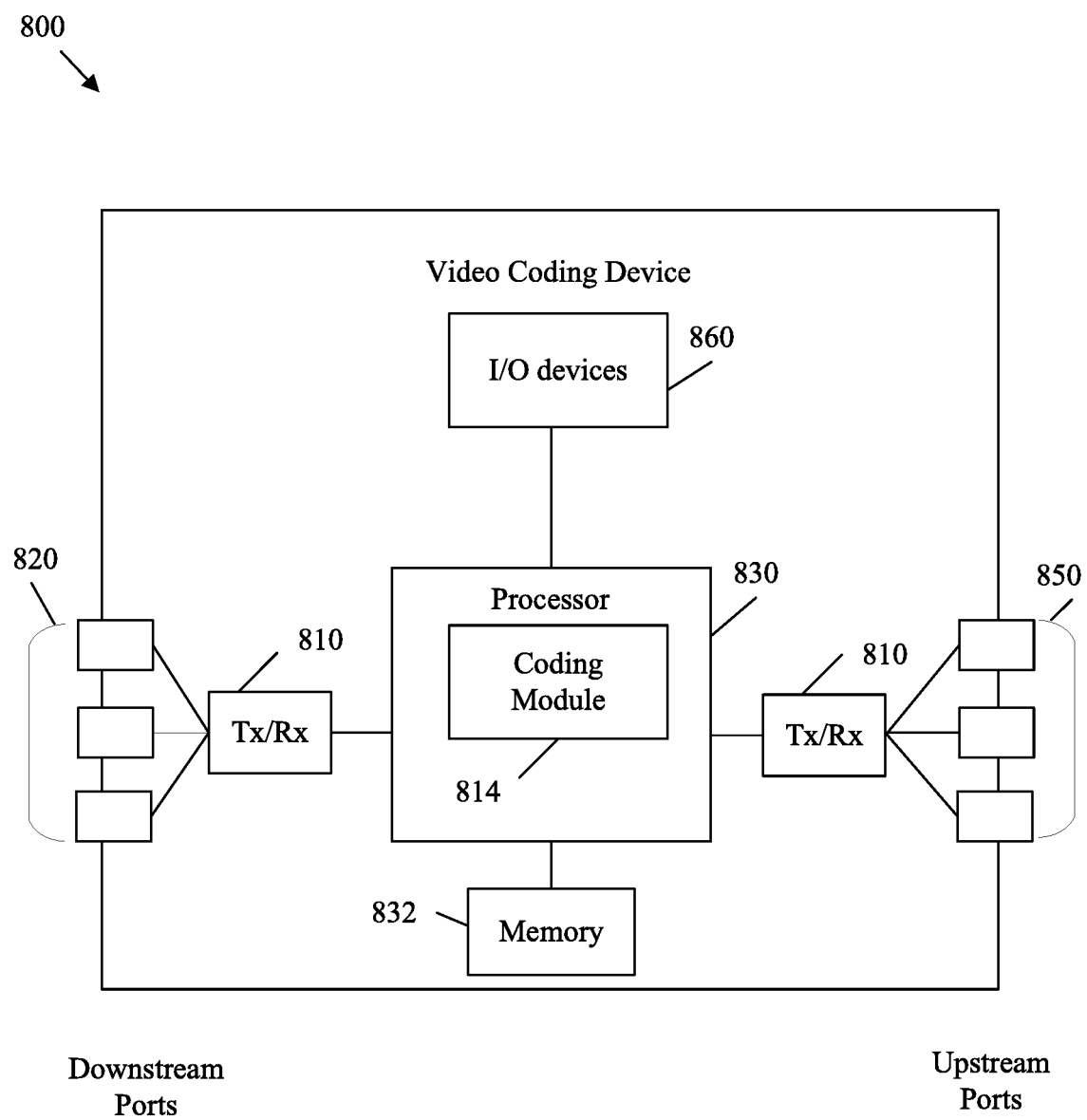
FIG. 8 is a schematic diagram of an example video coding device.

FIG. 8 is a schematic diagram of an example video coding device 800. The video coding device 800 is suitable for implementing the disclosed examples/embodiments as described herein. The video coding device 800 comprises downstream ports 820, upstream ports 850, and/or transceiver units (Tx/Rx) 810, including transmitters and/or receivers for communicating data upstream and/or downstream over a network. The video coding device 800 also includes a processor 830 including a logic unit and/or central processing unit (CPU) to process the data and a memory 832 for storing the data. The video coding device 800 may also comprise electrical, optical-to-electrical (OE) components, electrical-to-optical (EO) components, and/or wireless communication components coupled to the upstream ports 850 and/or downstream ports 820 for communication of data via electrical, optical, or wireless communication networks. The video coding device 800 may also include input and/or output (I/O) devices 860 for communicating data to and from a user. The I/O devices 860 may include output devices such as a display for displaying video data, speakers for outputting audio data, etc. The I/O devices 860 may also include input devices, such as a keyboard, mouse, trackball, etc., and/or corresponding interfaces for interacting with such output devices.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the downstream ports 820, Tx/Rx 810, upstream ports 850, and memory 832. The processor 830 comprises a coding module 814. The coding module 814 implements the disclosed embodiments described herein, such as methods 100, 900, and 1000, which may employ a multi-layer video sequence 600 and/or a bitstream 700. The coding module 814 may also implement any other method/mechanism described herein. Further, the coding module 814 may implement a codec system 200, an encoder 300, a decoder 400, and/or a HRD 500. For example, the coding module 814 may be employed signal and/or read various parameters as described herein. Further, the coding module may be employed to encode and/or decode a video sequence based on such parameters. As such, the signaling changes described herein may increase the efficiency and/or avoid errors in the coding module 814. Accordingly, the coding module 814 may be configured to perform mechanisms to address one or more of the problems discussed above. Hence, coding module 814 causes the video coding device 800 to provide additional functionality and/or coding efficiency when coding video data. As such, the coding module 814 improves the functionality of the video coding device 800 as well as addresses problems that are specific to the video coding arts. Further, the coding module 814 effects a transformation of the video coding device 800 to a different state. Alternatively, the coding module 814 can be implemented as instructions stored in the memory 832 and executed by the processor 830 (e.g., as a computer program product stored on a non-transitory medium).

The memory 832 comprises one or more memory types such as disks, tape drives, solid-state drives, read only memory (ROM), random access memory (RAM), flash memory, ternary content-addressable memory (TCAM), static random-access memory (SRAM), etc. The memory 832 may be used as an over-flow data storage device, to store programs when such programs are selected for execution, and to store instructions and data that are read during program execution.

Figure 9:
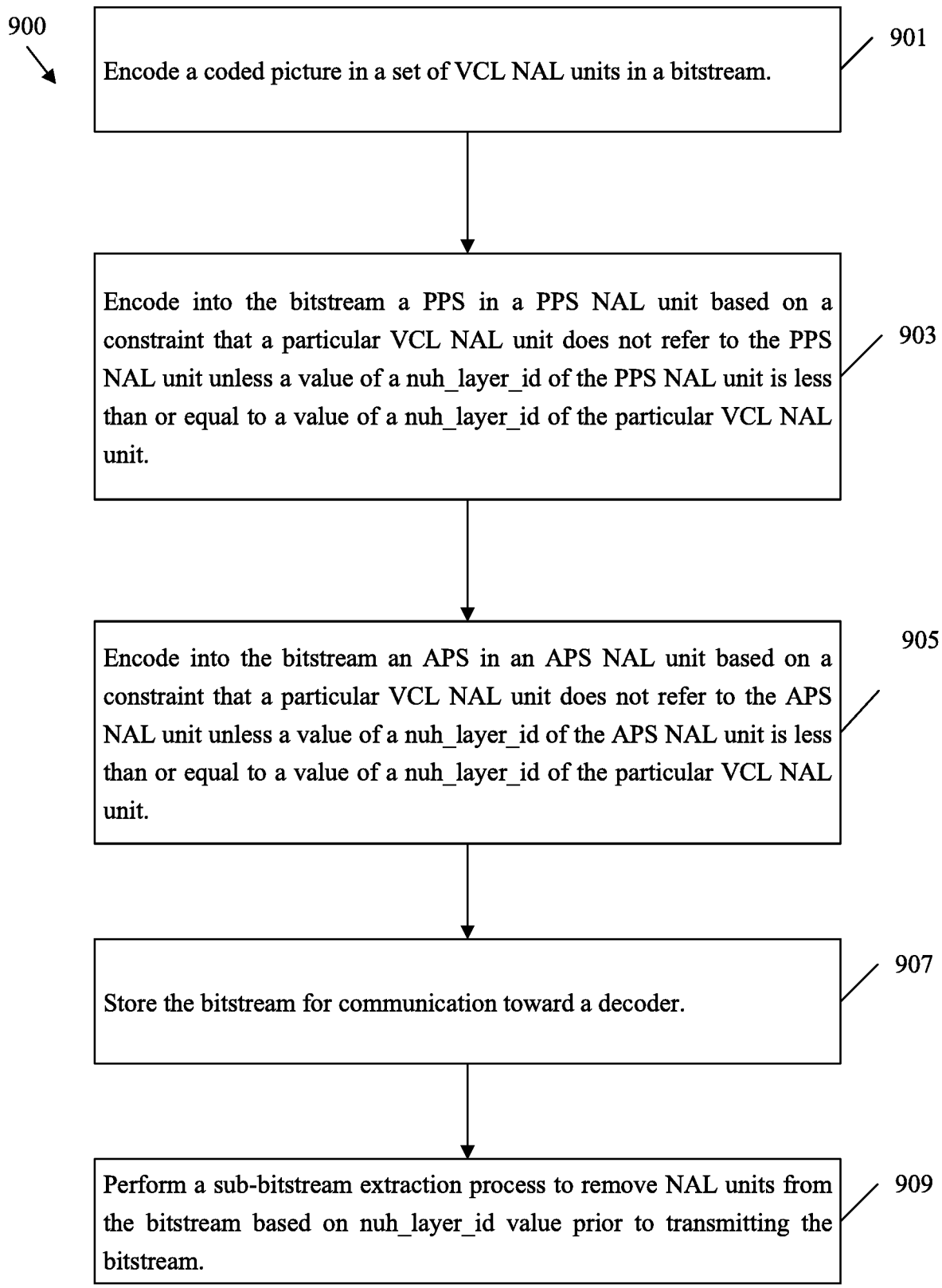
FIG. 9 is a flowchart of an example method of encoding a video sequence into a bitstream by constraining layer identifiers (IDs) for the PPS and the APS in the bitstream.

FIG. 9 is a flowchart of an example method 900 of encoding a video sequence into a bitstream, such as bitstream 700, by constraining layer IDs for the PPS and the APS in the bitstream. Method 900 may be employed by an encoder, such as a codec system 200, an encoder 300, and/or a video coding device 800 when performing method 100. Further, the method 900 may operate on a HRD 500 and hence may perform conformance tests on a multi-layer video sequence 600.

Method 900 may begin when an encoder receives a video sequence and determines to encode that video sequence into a multi-layer bitstream, for example based on user input. At step 901, the encoder encodes a coded picture in a set of VCL NAL units in a bitstream. For example, the coded picture may be included in a layer. Further, the encoder can encode one or more layers including the coded picture into a multi-layer bitstream. A layer may include a set of VCL NAL units with the same layer ID and associated non-VCL NAL units. For example, the set of VCL NAL units are part of a layer when the set of VCL NAL units all have a particular value of nuh_layer_id. A layer may include a set of VCL NAL units that contain video data of encoded pictures as well as any parameter sets used to code such pictures. One or more of the layers may be output layers. Layers that are not an output layer are encoded to support reconstructing the output layer(s), but such supporting layers are not intended for output at a decoder. In this way, the encoder can encode various combinations of layers for transmission to a decoder upon request. The layer can be transmitted as desired to allow the decoder to obtain different representations of the video sequence depending on network conditions, hardware capabilities, and/or user settings.

The layer also includes various non-VCL NAL units. The non-VCL NAL units are associated with the set of VCL NAL units that all have a particular value of nuh_layer_id. Constraints may be applied to the nuh_layer_id of the non-VCL NAL units to ensure that the non-VCL NAL units are properly associated with the VCL NAL units and are not removed from the bitstream by sub-bitstream extraction process prior to transmission to a decoder.

At step 903, the encoder encodes a PPS into the bitstream. The PPS is encoded into a PPS NAL unit. The PPS NAL unit is an example of a non-VCL NAL unit that is associated with one or more layers. The PPS NAL unit is coded based on a constraint that a particular VCL NAL unit does not/cannot refer to the PPS NAL unit unless a value of a nuh_layer_id of the PPS NAL unit is less than or equal to a value of a nuh_layer_id of the particular VCL NAL unit. Stated differently, the PPS and/or the PPS NAL unit are constrained to include a value of the nuh_layer_id that is less than or equal to the value of the nuh_layer_id of all VCL NAL units that refer to the PPS in the PPS NAL unit. Such a constraint or requirement ensures that the bitstream conforms with, for example, VVC or some other standard, modified as indicated herein. However, the encoder may also be capable of operating in other modes where it is not so constrained, such as when operating under a different standard or a different version of the same standard. The particular VCL NAL unit described in the constraint may comprise a slice of the coded picture and may be associated with a header, such as a slice header and/or a picture header, containing data elements pertaining to the slice. The header specifies a PPS ID of the PPS. The PPS ID in the header indicates that the slice refers to the PPS NAL unit and hence that the constraint applies.

At step 905, the encoder encodes an APS into the bitstream. The APS is encoded into an APS NAL unit. The APS NAL unit is an example of a non-VCL NAL unit that is associated with one or more layers. The APS NAL unit is coded based on a constraint that a particular VCL NAL unit does not refer to the APS NAL unit unless a value of a nuh_layer_id of the APS NAL unit is less than or equal to a value of a nuh_layer_id of the particular VCL NAL unit. Stated differently, the APS and/or the APS NAL unit are constrained to include a value of the nuh_layer_id that is less than or equal to the value of the nuh_layer_id of all VCL NAL units that refer to the APS in the APS NAL unit. The particular VCL NAL unit may comprise a slice of the coded picture and may be associated with a header, such as a slice header and/or a picture header, containing data elements pertaining to the slice. The header specifies an APS ID of the APS. The APS ID in the header indicates that the slice refers to the APS NAL unit and hence that the constraint applies. The preceding constraints and/or requirements ensure that the bitstream conforms with, for example, VVC or some other standard, modified as indicated herein. However, the encoder may also be capable of operating in other modes where it is not so constrained, such as when operating under a different standard or a different version of the same standard.

At step 907, the encoder can store the bitstream for communication toward a decoder upon request. Once a request is received, the encoder and/or a corresponding slicer can also perform a sub-bitstream extraction process to remove NAL units from the bitstream based on nuh_layer_id value at step 909. This process results in a bitstream that includes only the VCL NAL units and non-VCL NAL units associated with the requested layer(s). Due to the constraints discussed above, the PPS/PPS NAL units and/or the APS/APS NAL units are retained in the bitstream when the VCL NAL units in the requested layer(s) refer to them and are removed from the bitstream when the VCL NAL units in the requested layer(s) do not refer to them. The extracted bitstream can then be transmitted toward the decoder for decoding and output.

Figure 10:
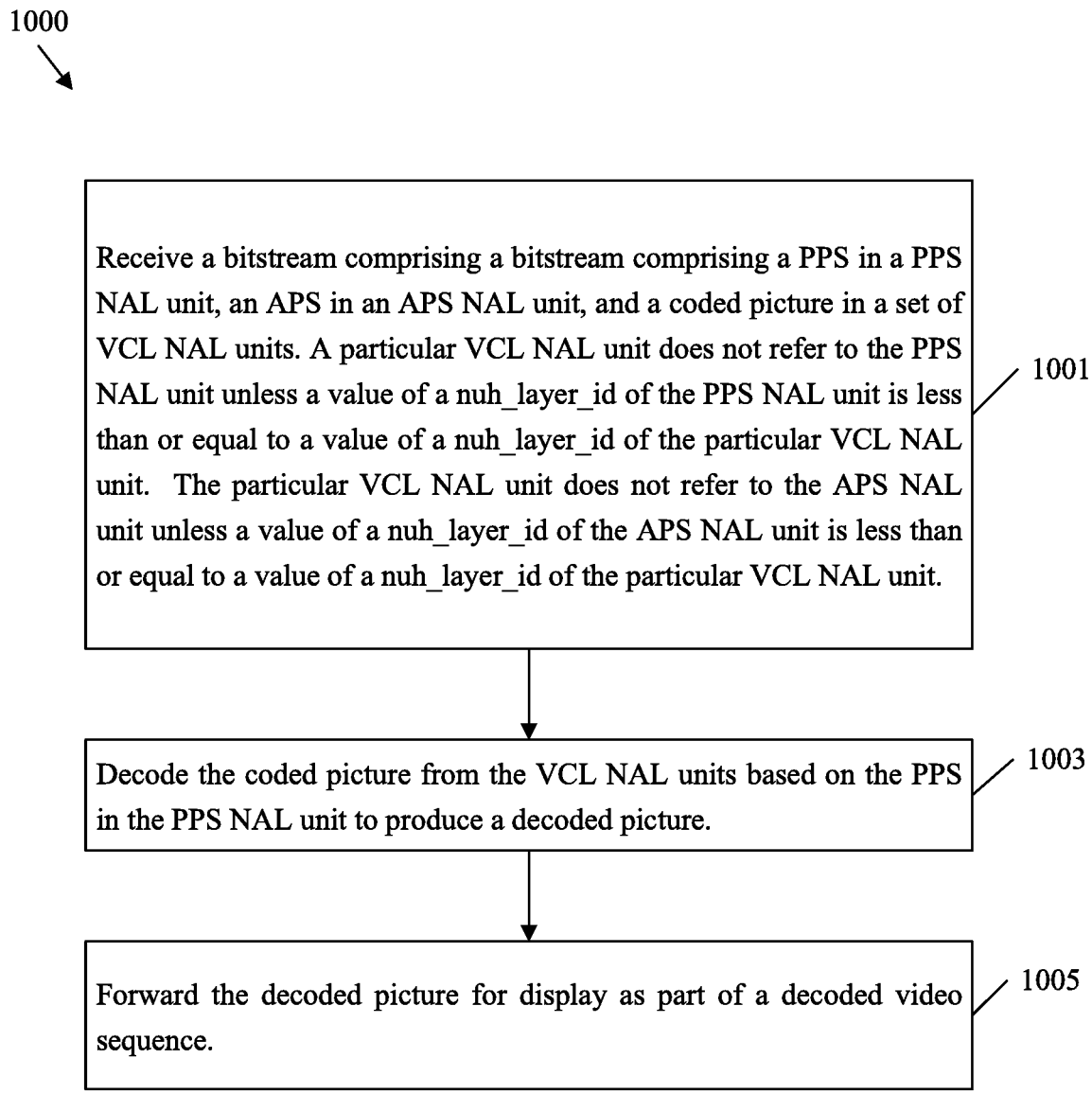
FIG. 10 is a flowchart of an example method of decoding a video sequence from a bitstream where layer IDs for the PPS and the APS in the bitstream are constrained.

FIG. 10 is a flowchart of an example method 1000 of decoding a video sequence from a bitstream, such as bitstream 700, where layer IDs for the PPS and the APS in the bitstream are constrained. Method 1000 may be employed by a decoder, such as a codec system 200, a decoder 400, and/or a video coding device 800 when performing method 100. Further, method 1000 may be employed on a multi-layer video sequence 600 that has been checked for conformance by a HRD, such as HRD 500.

Method 1000 may begin when a decoder begins receiving a bitstream of coded data representing a multi-layer video sequence, for example as a result of method 900 and/or in response to a request by the decoder. At step 1001, the decoder receives a bitstream comprising a PPS in a PPS NAL unit, an APS in an APS NAL unit and a coded picture in a set of VCL NAL units. For example, the coded picture may be included in a layer. Further, the bitstream may include one or more layers including the coded picture. A layer may include a set of VCL NAL units with the same layer ID and associated non-VCL NAL units. For example, the set of VCL NAL units are part of a layer when the set of VCL NAL units all have a particular value of nuh_layer_id. A layer may include a set of VCL NAL units that contain video data of coded pictures as well as any parameter sets used to code such pictures. One or more of the layers may be output layers. Layers that are not an output layer are encoded to support reconstructing the output layer(s), but such supporting layers are not intended for output. In this way, the decoder can obtain different representations of the video sequence depending on network conditions, hardware capabilities, and/or user settings. The layer also includes various non-VCL NAL units. The non-VCL NAL units are associated with the set of VCL NAL units that all have a particular value of nuh_layer_id. Constraints may be applied to the nuh_layer_id of the non-VCL NAL units to ensure that the non-VCL NAL units are properly associated with the VCL NAL units and are not removed from the bitstream by sub-bitstream extraction process prior to transmission to a decoder.

The PPS NAL unit is an example of a non-VCL NAL unit that is associated with one or more layers. The PPS NAL unit is coded based on a constraint that a particular VCL NAL unit (e.g., from the set of VCL NAL units) does not/cannot refer to the PPS NAL unit unless a value of a nuh_layer_id of the PPS NAL unit is less than or equal to a value of a nuh_layer_id of the particular VCL NAL unit. Stated differently, the PPS and/or the PPS NAL unit are constrained to include a value of the nuh_layer_id that is less than or equal to the value of the nuh_layer_id of all VCL NAL units that refer to the PPS in the PPS NAL unit. The particular VCL NAL unit may comprise a slice of the coded picture and may be associated with a header, such as a slice header and/or a picture header, containing data elements pertaining to the slice. The header specifies a PPS ID of the PPS. The PPS ID in the header indicates that the slice refers to the PPS NAL unit and hence that the constraint applies.

The APS NAL unit is another example of a non-VCL NAL unit that is associated with one or more layers. The APS NAL unit is coded based on a constraint that a particular VCL NAL unit does not refer to the APS NAL unit unless a value of a nuh_layer_id of the APS NAL unit is less than or equal to a value of a nuh_layer_id of the particular VCL NAL unit. Stated differently, the APS and/or the APS NAL unit are constrained to include a value of the nuh_layer_id that is less than or equal to the value of the nuh_layer_id of all VCL NAL units that refer to the APS in the APS NAL unit. The particular VCL NAL unit may comprise a slice of the coded picture and may be associated with a header, such as a slice header and/or a picture header, containing data elements pertaining to the slice. The header specifies an APS ID of the APS. The APS ID in the header indicates that the slice refers to the APS NAL unit and hence that the constraint applies.

The bitstream received at step 1001 is a result of a sub-bitstream extraction process that removes NAL units from the bitstream based on nuh_layer_id value. This process results in a bitstream that includes only the VCL NAL units and non-VCL NAL units associated with the requested layer(s). Due to the constraints discussed above, the PPS/PPS NAL units and/or the APS/APS NAL units are retained in the bitstream when the VCL NAL units in the received layer(s) refer to them and are removed from the bitstream when the VCL NAL units in the received layer(s) do not refer to them. In an embodiment, the video decoder expects the VCL NAL units, the PPS NAL unit, and the APS NAL unit to contain nuh_layer_id that are constrained as described above based on VVC or some other standard. If, however, the decoder determines that this condition is not true, the decoder may detect an error, signal an error, request that a revised bitstream (or a portion thereof) be resent, or take some other corrective measures to ensure that a conforming bitstream is received.

At step 1003, the decoder can decode the coded picture from the set of VCL NAL units based on the PPS in the PPS NAL unit and/or the APS in the APS NAL unit to produce a decoded picture. At step 1005, the decoder can forward the decoded picture for display as part of a decoded video sequence.

Figure 11:
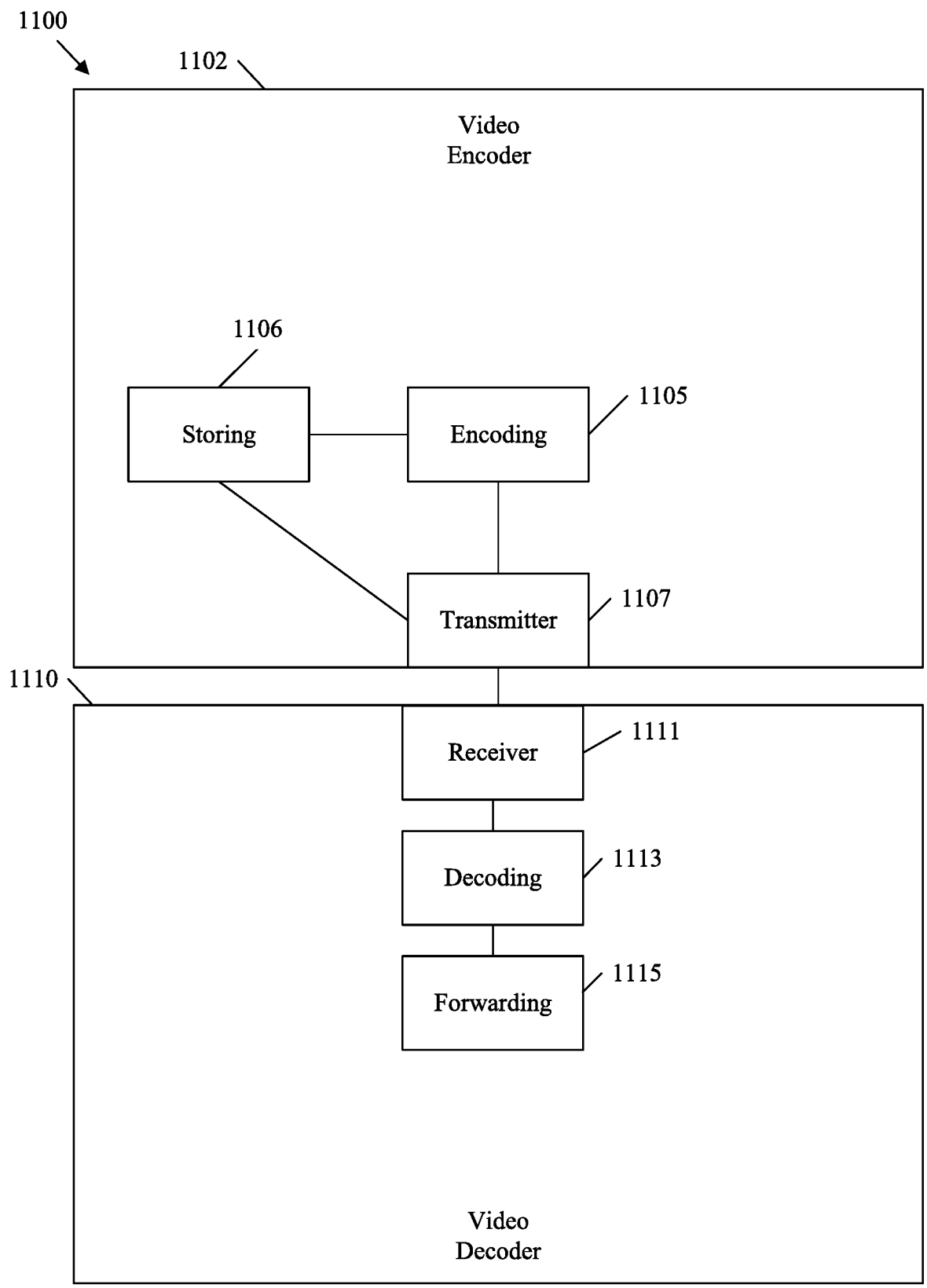
FIG. 11 is a schematic diagram of an example system for coding a video sequence using a bitstream where layer IDs for the PPS and the APS in the bitstream are constrained.

FIG. 11 is a schematic diagram of an example system 1100 for coding a video sequence using a bitstream where layer IDs for the PPS and the APS in the bitstream are constrained. System 1100 may be implemented by an encoder and a decoder such as a codec system 200, an encoder 300, a decoder 400, and/or a video coding device 800. Further, the system 1100 may employ a HRD 500 to perform conformance tests on a multi-layer video sequence 600 and/or a bitstream 700. In addition, system 1100 may be employed when implementing method 100, 900, and/or 1000.

The system 1100 includes a video encoder 1102. The video encoder 1102 comprises an encoding module 1105 for encoding a coded picture in a set of VCL NAL units in a bitstream. The encoding module 1105 is further for encoding into the bitstream a PPS in a PPS NAL unit based on a constraint that a particular VCL NAL unit (e.g., from the set of VC NAL units) does not refer to the PPS NAL unit unless a value of a nuh_layer_id of the PPS NAL unit is less than or equal to a value of a nuh_layer_id of the particular VCL NAL unit. The video encoder 1102 further comprises a storing module 1106 for storing the bitstream for communication toward a decoder. The video encoder 1102 further comprises a transmitting module 1107 for transmitting the bitstream toward a video decoder 1110. The video encoder 1102 may be further configured to perform any of the steps of method 900.

The system 1100 also includes a video decoder 1110. The video decoder 1110 comprises a receiving module 1111 for receiving a bitstream comprising a PPS in a PPS NAL unit and a coded picture in a set of VCL NAL units, wherein a particular VCL NAL unit does not refer to the PPS NAL unit unless a value of a nuh_layer_id of the PPS NAL unit is less than or equal to a value of a nuh_layer_id of the particular VCL NAL unit. The video decoder 1110 further comprises a decoding module 1113 for decoding the coded picture from the set of VCL NAL units based on the PPS in the PPS NAL unit to produce a decoded picture. The video decoder 1110 further comprises a forwarding module 1115 for forwarding the decoded picture for display as part of a decoded video sequence. The video decoder 1110 may be further configured to perform any of the steps of method 1000.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, the method comprising:
receiving a bitstream comprising a picture parameter set (PPS) in a PPS network abstraction layer (NAL) unit and a coded picture comprising a set of video coding layer (VCL) NAL units, wherein a particular VCL NAL unit does not refer to the PPS NAL unit unless a value of a NAL unit header layer identifier (nuh_layer_id) of the PPS NAL unit is less than or equal to a value of a nuh_layer_id of the particular VCL NAL unit, wherein the particular VCL NAL unit comprises a slice of the coded picture and a slice header containing data elements pertaining to the slice, wherein the slice header specifies an adaptation parameter set (APS) identifier (ID) of an APS, wherein the slice is associated with a picture header that contains syntax elements that apply to the slice of the coded picture, and wherein the picture header specifies a PPS ID of the PPS in use for the coded picture; and
decoding the coded picture from the set of VCL NAL units based on the PPS in the PPS NAL unit to produce a decoded picture.

2. The method of claim 1, wherein the bitstream further comprises the APS in an APS NAL unit, and wherein the particular VCL NAL unit does not refer to the APS NAL unit unless a value of a nuh_layer_id of the APS NAL unit is less than or equal to the value of the nuh_layer_id of the particular VCL NAL unit.

3. The method of claim 1, wherein the bitstream is a result of a sub-bitstream extraction process that removes NAL units from the bitstream based on nuh_layer_id value.

4. The method of claim 1, further comprising:
receiving a second bitstream comprising a second PPS in a second PPS NAL unit and a second coded picture comprising a second set of VCL NAL units, wherein a second VCL NAL unit refers to the second PPS NAL unit with a value of a nuh_layer_id of the second PPS NAL unit is not less than or equal to a value of a nuh_layer_id of the second VCL NAL unit; and
in response to the receiving, taking some other corrective measures to ensure that a conforming bitstream corresponding to the second bitstream is received prior to decoding the coded picture from the second set of VCL NAL units.

5. The method of claim 1, wherein the set of VCL NAL units are part of a layer when the set of VCL NAL units all have a particular value of nuh_layer_id.

6. The method of claim 5, wherein the layer includes non-VCL NAL units that are associated with the set of VCL NAL units that all have a particular value of nuh_layer_id.

7. A method implemented by an encoder, the method comprising:
encoding a coded picture comprising a set of video coding layer (VCL) network abstraction layer (NAL) units in a bitstream;
encoding into the bitstream a picture parameter set (PPS) in a PPS NAL unit based on a constraint that a particular VCL NAL unit does not refer to the PPS NAL unit unless a value of a NAL unit header layer identifier (nuh_layer_id) of the PPS NAL unit is less than or equal to a value of a nuh_layer_id of the particular VCL NAL unit, wherein the particular VCL NAL unit comprises a slice of the coded picture and a slice header containing data elements pertaining to the slice, wherein the slice header specifies an adaptation parameter set (APS) identifier (ID) of an APS, wherein the slice is associated with a picture header that contains syntax elements that apply to the slice of the coded picture, and wherein the picture header specifies a PPS ID of the PPS in use for the coded picture.

8. The method of claim 7, further comprising encoding into the bitstream the APS in an APS NAL unit based on a constraint that a particular VCL NAL unit does not refer to the APS NAL unit unless a value of a nuh_layer_id of the PPS NAL unit is less than or equal to a value of a nuh_layer_id of the particular VCL NAL unit.

9. The method of claim 7, further comprising performing a sub-bitstream extraction process to remove NAL units from the bitstream based on nuh_layer_id value.

10. The method of claim 7, wherein the set of VCL NAL units are part of a layer when the set of VCL NAL units all have a particular value of nuh_layer_id.

11. The method of claim 10, wherein the layer includes non-VCL NAL units that are associated with the set of VCL NAL units that all have a particular value of nuh_layer_id.

12. A video coding device comprising:
a receiver configured to receive a bitstream comprising a picture parameter set (PPS) in a PPS network abstraction layer (NAL) unit and a coded picture comprising a set of video coding layer (VCL) NAL units, wherein a particular VCL NAL unit does not refer to the PPS NAL unit unless a value of a NAL unit header layer identifier (nuh_layer_id) of the PPS NAL unit is less than or equal to a value of a nuh_layer_id of the particular VCL NAL unit, wherein the particular VCL NAL unit comprises a slice of the coded picture and a slice header containing data elements pertaining to the slice, wherein the slice header specifies an adaptation parameter set (APS) identifier (ID) of an APS, wherein the slice is associated with a picture header that contains syntax elements that apply to the slice of the coded picture, and wherein the picture header specifies a PPS ID of the PPS in use for the coded picture; and a processor coupled to the receiver and configured to decode the coded picture from the set of VCL NAL units based on the PPS in the PPS NAL unit to produce a decoded picture.

13. The video coding device of claim 12, wherein the bitstream further comprises the APS in an APS NAL unit, and wherein the particular VCL NAL unit does not refer to the APS NAL unit unless a value of a nuh_layer_id of the APS NAL unit is less than or equal to the value of the nuh_layer_id of the particular VCL NAL unit.

14. The video coding device of claim 12, wherein the bitstream is a result of a sub-bitstream extraction process that removes NAL units from the bitstream based on nuh_layer_id value.

15. The video coding device of claim 12, wherein the set of VCL NAL units are part of a layer when the set of VCL NAL units all have a particular value of nuh_layer_id.

16. The video coding device of claim 15, wherein the layer includes non-VCL NAL units that are associated with the set of VCL NAL units that all have a particular value of nuh_layer_id.

\* \* \* \* \*